US010856185B2

(12) United States Patent
Lei et al.

(10) Patent No.: US 10,856,185 B2
(45) Date of Patent: Dec. 1, 2020

(54) CHANNEL RESERVATION SIGNALS FOR NEW RADIO INTERFERENCE MANAGEMENT

(71) Applicant: QUALCOMM Incorporated, San Diego, CA (US)

(72) Inventors: Jing Lei, San Diego, CA (US); Taesang Yoo, San Diego, CA (US); Xiaoxia Zhang, San Diego, CA (US); Jing Sun, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 32 days.

(21) Appl. No.: 15/663,461

(22) Filed: Jul. 28, 2017

(65) Prior Publication Data
US 2018/0167848 A1 Jun. 14, 2018

Related U.S. Application Data

(60) Provisional application No. 62/438,409, filed on Dec. 22, 2016, provisional application No. 62/432,251, filed on Dec. 9, 2016.

(51) Int. Cl.
H04W 28/00 (2009.01)
H04W 28/26 (2009.01)
(Continued)

(52) U.S. Cl.
CPC ....... H04W 28/26 (2013.01); H04W 72/0453 (2013.01); H04W 74/0816 (2013.01);
(Continued)

(58) Field of Classification Search
CPC ............. H04W 28/26; H04W 72/0453; H04W 72/0406; H04W 72/082; H04W 72/10;
(Continued)

(56) References Cited

U.S. PATENT DOCUMENTS

2014/0092860 A1* 4/2014 Kneckt ............. H04W 72/1205
370/329
2014/0112175 A1* 4/2014 Pantelidou ............ H04W 28/26
370/252
(Continued)

FOREIGN PATENT DOCUMENTS

WO WO-2016048798 A1 * 3/2016 ........ H04W 74/0816
WO WO-2016182345 A1 11/2016

OTHER PUBLICATIONS

International Search Report and Written Opinion—PCT/US2017/060317—ISA/EPO—dated Apr. 17, 2018.

Primary Examiner — Khai M Nguyen
(74) Attorney, Agent, or Firm — Qualcomm/Norton Rose Fulbright US LLP

(57) ABSTRACT

Channel reservation systems and methods are disclosed herein, which schedule transmissions on a shared radio medium that is shared by a plurality of licensed network operators. In embodiments, priority access is pre-assigned to the network and the method determines whether to send a transmission based at least on the transmitter's priority class as compared to another transmitter's priority class and to which transmitter the time slot of a signal is dedicated. In embodiments, priority access may not be preassigned to the network and pre-grants may be used in conjunction with CR-Ts and CR-Rs to determine whether a transmitter transmits.

18 Claims, 24 Drawing Sheets

(51) Int. Cl.
*H04W 72/04* (2009.01)
*H04W 74/08* (2009.01)
*H04W 16/14* (2009.01)
*H04W 72/08* (2009.01)
*H04W 72/10* (2009.01)
*H04W 74/00* (2009.01)

(52) U.S. Cl.
CPC ........ *H04W 16/14* (2013.01); *H04W 72/0406* (2013.01); *H04W 72/082* (2013.01); *H04W 72/10* (2013.01); *H04W 74/004* (2013.01)

(58) Field of Classification Search
CPC H04W 74/0816; H04W 74/004; H04W 16/14
USPC ......................................................... 455/450
See application file for complete search history.

(56) References Cited

U.S. PATENT DOCUMENTS

| | | | |
|---|---|---|---|
| 2015/0092758 A1* | 4/2015 | Chen | H04W 16/14 370/336 |
| 2015/0124744 A1* | 5/2015 | Zhu | H04W 72/1257 370/329 |
| 2015/0236829 A1* | 8/2015 | Ratasuk | H04W 28/26 370/329 |
| 2016/0278030 A1* | 9/2016 | Yi | H04W 16/32 |
| 2016/0286545 A1* | 9/2016 | Luo | H04W 72/0413 |
| 2017/0013470 A1* | 1/2017 | Sun | H04W 16/14 |
| 2017/0013479 A1* | 1/2017 | Sun | H04W 24/08 |
| 2017/0019909 A1* | 1/2017 | Si | H04L 47/27 |
| 2017/0099678 A1* | 4/2017 | Dinan | H04W 74/0808 |
| 2017/0347366 A1* | 11/2017 | Ling | H04W 16/14 |

* cited by examiner

CHANNEL RESERVATION SIGNALS FOR NEW RADIO INTERFERENCE MANAGEMENT

CROSS-REFERENCE TO RELATED APPLICATIONS

This application claims the benefit of U.S. Provisional Patent Application No. 62/432,251, entitled, "CHANNEL RESERVATION SIGNALS FOR NEW RADIO INTERFERENCE MANAGEMENT," filed on Dec. 9, 2016, and U.S. Provisional Patent Application No. 62/438,409, entitled, "CHANNEL RESERVATION SIGNAL BASED CONTENTION DESIGN FOR SHARED SPECTRUM," filed on Dec. 22, 2016, the disclosures of which are hereby incorporated by reference herein in its entirety as if fully set forth below and for all applicable purposes.

TECHNICAL FIELD

Aspects of the present disclosure relate generally to wireless communication systems, and more particularly, to unique reservation techniques employing the use of new radio channel reservation signals in order to allow multiple operators to share the same radio medium.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs (e.g., evolved node Bs (eNBs)) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

New Radio (NR), also known as 5G or the $5^{th}$ generation of wireless systems, involves increasingly intricate cell deployment because radio mediums are now capable of handling inter-cell deployments and intra-cell deployments. In short, a single radio medium now supports multiple operators (e.g., AT&T, T-Mobile, Sprint, Verizon, etc.). Because a radio medium now supports more operators, radio mediums experience increased signal traffic, which inevitably results in more signal interference including collisions, noise, and the like.

Further, NR's cell deployments are further complicated by the increased use of low power eNBs (e.g., access point base stations, femtocells, and/or the like) that function as picocells, which operate within the macrocell of a more powerful eNB such as a base station tower. The NR picocells operate in the above described cell deployment, and as such, are operable to handle radio mediums that support multiple operators. As such, the low power eNBs experience increased signal interference including collisions, noise, and the like.

Moreover, the mixed environment of low power eNBs, more powerful eNBs, and intra-operator radio mediums creates a competitive environment, wherein the eNBs compete for frames within which they can schedule information transmissions. Larger eNBs (e.g., towers) operate with much more power as compared to smaller eNBs (e.g., femtocells). Thus, in this competitive environment, smaller eNBs fall victim to the larger, more aggressive, eNBs. For example, if a femtocell attempts to transmit data at the same time as a tower, the more powerful transmission of the tower will almost always over power the less powerful transmission of the femtocell, thereby preventing the femtocell from effectively transmitting its data. NR's complexity caused by both intra-operator radio mediums and the mix of picocells and macrocells makes interference management more challenging as compared to previous wireless generations (e.g., LTE, 3GPP, and/or the like).

To add to the above described complexity, various eNBs within the mixed environment may have various quality of services requirements. In short, some data transmissions may be assigned to a different priority class as compared to other data based on a quality of service requirement. Therefore, some data in this highly competitive environment is treated differently as compared to the other data, and the various eNBs need a way to coordinate their transmissions in order to meet the various quality of services requirements.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In this competitive environment, it would be desirable to have a solution that allows victim eNBs and UEs to transmit data despite the presence of aggressor eNBs and UEs within the same environment. Further, it would be preferable if the solution took into account NR's medium sharing among different operators, power classes, and priority classes within a dynamic Time Division Duplexing (TDD) environment. The present disclosure proposes solving the interference problems described above by implementing a unique reservation technique.

In short, the unique reservation technique employs the use of new radio channel reservation signals. The channel reservation signals are used to protect a specific power class and/or priority class. In terms of a power class, a channel reservation signal may be used to protect a class of eNBs operating within a certain transmission power and/or a range of transmission powers. In terms of the priority class, a channel reservation signal may be used to ensure the various quality of services requirements involved. The unique reservation technique disclosed herein provides a solution that can handle a variety of power classes and a variety of priority classes.

Moreover, the unique reservation technique disclosed herein operates on a shared spectrum (e.g., unlicensed and licensed spectrum) and operates with both inter-operator and intra-operator deployments. Further still, the channel reservation signals' frame and/or subframe structures have been designed to function in an NR deployment and to be backwards compatible (e.g., LTE, 3GPP, and/or the like). Further still, the inventors recognize that some systems are capable of handling Coordinated Multipoint (CoMP), while others are not. Thus, the channel reservation signals have been designed to function with systems having CoMP and with those systems that do not. Still further, channel reservation signals' frame and/or subframe structures and the deployment thereof are designed to ensure low overhead and low detection latency. Further, channel reservation signals' frame and/or subframe structures and the deployment thereof are designed to ensure sufficient penetration and high reliability.

In one aspect of the disclosure, a channel reservation method for scheduling transmissions on a shared radio medium that is shared by a plurality of licensed network operators is disclosed. An example method determines whether priority access to time slots of the shared radio medium has been assigned to a network at that time and based on the determination, reduces contention of access to the shared radio medium by performing a hand-shaking operation.

An example hand-shaking operation can include a channel reservation method, which schedules transmissions on a shared radio medium that is shared by a plurality of network operators. The method may comprise listening, by a second classified eNB, for an RRQ and/or RRS sent by a first classified eNB; based at least on the listening, determining, by the second classified eNB, whether to send a transmission on the shared radio medium, wherein the first classified eNB is assigned a higher priority as compared to the second classified eNB, when transmitting on the shared radio medium. The method may further comprise, based at least on the detecting deciding, by the second classified eNB, that the first eNB has scheduled a transmission, and based at least on the deciding, refraining, by the second classified eNB, from transmitting during the transmission of the first classified eNB. Alternatively, based at least on the detecting, deciding, by the second classified eNB, that the first eNB has not scheduled a transmission, and based at least on the deciding, scheduling, by the second classified eNB, a transmission using the shared radio medium.

In example methods, the second classified eNB's scheduling of an uplink transmission using the shared radio medium comprises sending, by the second classified eNB, an RRQ during the second classified eNB's assigned RRQ time slot within the transmit opportunity over the shared radio medium, sending, by the second classified eNB, an RRS during the second classified eNB's assigned RRS time slot within the transmit opportunity over the shared radio medium, and receiving, by the second classified eNB, an uplink transmission on the shared radio medium. In example methods, the second classified eNB's scheduling of a downlink transmission using the shared radio medium comprises sending, by the second classified eNB, an RRQ during the second classified eNB's assigned RRQ time slot within the transmit opportunity over the shared radio medium, receiving, by the second classified eNB, an RRS during the second classified eNB's assigned RRS time slot within the transmit opportunity over the shared radio medium, and sending, by the second classified eNB, a downlink transmission on the shared radio medium.

In example embodiments, the first classified eNB is classified as a victim node and the second classified eNB is classified as an aggressor node. Additionally or alternatively, the first classified eNB is assigned a higher quality of service requirement as compared to the second classified eNB. Further, additional nodes may be included in the method described above, and each node may be classified according to its transmission power, as compared to the other nodes, and/or its quality of service requirements, as compared to the other nodes.

In additional aspects of the disclosure, a channel reservation system for scheduling transmissions on a shared radio medium that is shared by a plurality of licensed network operators is disclosed. An example system determines whether priority access to time slots of the shared radio medium has been assigned to a network at that time and based on the determination, reduces contention of access to the shared radio medium by performing a hand-shaking operation.

An example hand-shaking operation can include an apparatus (e.g., a second classified eNB) is configured for reserving channels by scheduling transmissions on a shared radio medium that is shared by a plurality of network operators is provided. In embodiments, the second classified eNB includes a processor that is operable to listen for an RRQ and/or RRS sent by a first classified eNB and is further operable to determine whether to send a transmission on the shared radio medium based at least on the listening. The second classified eNB may also include a transmitter operable to send a transmission on the shared radio medium. In embodiments, the first classified eNB is assigned a higher priority as compared to the second classified eNB, when transmitting on the shared radio medium, and transmission decisions may be based on these priorities. As such, when the processor of the second classified eNB determines that the first classified eNB has scheduled a transmission, the transmitter of the second eNB is operable to refrain from transmitting during the transmission of the first classified eNB. Alternatively, when the processor of the second classified eNB decides that the first eNB has not scheduled a transmission, the second classified eNB's transmitter is operable to send a transmission using the shared radio medium.

When receiving an uplink transmission, the second classified eNB's processor directs the transmitter to send an RRQ during the second classified eNB's assigned RRQ time slot within the shared radio medium, and send an RRS during the second classified eNB's assigned RRS time slot over the shared radio medium. Further, the second classified eNB's processor directs the receiver to receive an uplink transmission on the shared radio medium. When sending a downlink transmission, the second classified eNB's processor directs the transmitter to send an RRQ during the second classified eNB's assigned RRQ time slot within the shared radio medium, directs the receiver to receive an RRS during the second classified eNB's assigned RRS time slot over the shared radio medium, and then, directs the transmitter to send a downlink transmission on the shared radio medium.

In example embodiments, the first classified eNB is classified as a victim node and the second classified eNB is classified as an aggressor node. Additionally or alternatively, the first classified eNB is assigned a higher quality of service requirement as compared to the second classified eNB. Further, additional nodes may be included in the system described above, and each node may be classified according to its transmission power, as compared to the other nodes, and/or its quality of service requirements, as compared to the other nodes.

In additional aspects of the disclosure, a channel reservation system for scheduling transmissions on a shared radio medium that is shared by a plurality of licensed network operators is disclosed. An example system includes means for determining whether priority access to time slots of the shared radio medium has been assigned to a network at that time and based on the determination, the system includes means for reducing contention of access to the shared radio medium by performing a hand-shaking operation.

An example hand-shaking operation can include means for listening for an RRQ and/or RRS sent by a first classified eNB; based at least on the listening, means for determining whether a second classified eNB should send a transmission on the shared radio medium, wherein the first classified eNB is assigned a higher priority as compared to the second classified eNB, when transmitting on the shared radio medium. The system may further comprise, based at least on the determining, means for deciding that the first eNB has scheduled a transmission; and based at least on the deciding, means for refraining the second classified eNB from transmitting during the transmission of the first classified eNB. In embodiment, the system comprises, based at least on the determining, means for deciding that the first eNB has not scheduled a transmission; and based at least on the deciding, means for scheduling a transmission of the second classified eNB using the shared radio medium.

The example system may schedule an uplink transmission wherein the system includes means for sending an RRQ during the second classified eNB's assigned RRQ time slot within the shared radio medium; means for sending an RRS during the second classified eNB's assigned RRS time slot within the shared radio medium; and means for receiving an uplink transmission on the shared radio medium. Further, the system may schedule a downlink transmission wherein the system includes means for sending an RRQ during the second classified eNB's assigned RRQ time slot within the shared radio medium; means for receiving an RRS during the second classified eNB's assigned RRS time slot within the shared radio medium; and means for sending a downlink transmission on the shared radio medium.

In example embodiments, the first classified eNB is classified as a victim node and the second classified eNB is classified as an aggressor node. Additionally or alternatively, the first classified eNB is assigned a higher quality of service requirement as compared to the second classified eNB. Further, additional nodes may be included in the system described above, and each node may be classified according to its transmission power, as compared to the other nodes, and/or its quality of service requirements, as compared to the other nodes.

In additional aspects of the disclosure, embodiments may include a non-transitory computer-readable medium having program code recorded thereon, which when executed on a computer processor cause the computer processor to perform channel reservation functions for scheduling transmissions on a shared radio medium that is shared by a plurality of licensed network operators is disclosed. An example system includes code for determining whether priority access to time slots of the shared radio medium has been assigned to a network at that time and based on the determination, the system includes code for reducing contention of access to the shared radio medium by performing a hand-shaking operation.

An example hand-shaking operation can include program code for listening for an RRQ and/or RRS sent by a first classified eNB; based at least on the listening, program code for determining whether a second classified eNB should send a transmission on the shared radio medium, wherein the first classified eNB is assigned a higher priority as compared to the second classified eNB, when transmitting on the shared radio medium.

The system may further comprise, based at least on the determining, program code for deciding that the first eNB has scheduled a transmission; and based at least on the deciding, program code for refraining the second classified eNB from transmitting during the transmission of the first classified eNB. Further, the system may comprise, based at least on the determining, program code for deciding that the first eNB has not scheduled a transmission; and based at least on the deciding, program code for scheduling a transmission of the second classified eNB using the shared radio medium.

When scheduling an uplink transmission, the system may comprise program code for sending an RRQ during the second classified eNB's assigned RRQ time slot within the shared radio medium; program code for sending an RRS during the second classified eNB's assigned RRS time slot over the shared radio medium; and program code for receiving an uplink transmission on the shared radio medium. When scheduling a downlink transmission, the system may further comprise program code for sending an RRQ during the second classified eNB's assigned RRQ time slot within the shared radio medium; program code for receiving an RRS during the second classified eNB's assigned RRS time slot over the shared radio medium; and program code for sending a downlink transmission on the shared radio medium.

In example embodiments, the first classified eNB is classified as a victim node and the second classified eNB is classified as an aggressor node. Additionally or alternatively, the first classified eNB is assigned a higher quality of service requirement as compared to the second classified eNB. Further, additional nodes may be included in the system described above, and each node may be classified according to its transmission power, as compared to the other nodes, and/or its quality of service requirements, as compared to the other nodes.

In one aspect of the disclosure, a channel reservation method for scheduling transmissions on a shared radio medium that is shared by a plurality of licensed network operators is disclosed. An example method determines whether priority access to time slots of the shared radio medium has been assigned to a network at that time and based on the determination, reduces contention of access to the shared radio medium by performing a hand-shaking operation.

An example hand-shaking operation can include obtaining, at a transmitter, a contention pre-grant request including a schedule of communication between the transmitter and one or more receivers, transmitting, by the transmitter, a transmitter channel reservation signal identifying an intent to transmit data to one or more target receivers associated with the communication and a transmission power level intended for the data transmission, wherein the one or more target receivers are one or more of the one or more receivers, receiving, at the transmitter, one or more receiver channel reservation signals from the one or more receivers, wherein the one or more receiver channel reservation signals identifies an intent to receive, a receive transmit power level of the receiver channel reservation signal, and a maximum interference level acceptable of each of the one or more receivers, determining, by the transmitter, an interference level expected at each of the one or more receivers based on the transmission power level during the data transmission, and managing transmission, by the transmitter, of the data based at least in part on comparison of the interference level and the maximum interference level.

In an additional aspect of the disclosure, a method of wireless communication includes obtaining, at a receiver, a pre-grant schedule of communication between the receiver and a target transmitter of one or more transmitters, transmitting, by the receiver, a receiver channel reservation signal identifying an intention to receive data associated with the communication, a receiver transmission power level of the receiver channel reservation signal, and a maximum interference level acceptable at the receiver, receiving, at the receiver, one or more transmitter channel reservation signals, wherein the one or more transmitter channel reservation signals identifies an intent to transmit and a transmission power level of each of the one or more transmitters, determining, by the receiver, an interference level expected at the receiver based on the transmission power level of the one or more transmitters, and managing reception, at the receiver, of the data based at least in part on the interference level.

In an additional aspect of the disclosure, a method of wireless communication includes transmitting, by a base station, a data pre-grant for data transmission on a first frequency location to one or more UEs, transmitting, by the base station, a contention pre-grant on a second frequency location to the one or more UEs, receiving, at the base station, a pre-grant acknowledgement on an uplink transmission from the one or more UEs, performing contention resolution, by the base station, during a contention period of a current slot, and transmitting data from the base station to the one or more UEs in response to detecting success of the contention resolution.

In an additional aspect of the disclosure, a method of wireless communication includes transmitting, by a base station, a data pre-grant request followed by a downlink reference signal to one or more UEs, receiving, at the base station, one or more uplink channel reservation signals from the one or more UEs, receiving, at the base station, one or more data pre-grant acknowledgements followed by one or more uplink reference signals from the one or more UEs after the receiving the one or more uplink channel reservation signals, wherein the one or more uplink channel reservation signals are processed during the receiving the one or more data pre-grant acknowledgments and the one or more uplink reference signals, transmitting, by the base station, a downlink channel reservation signal to the one or more receivers, and transmitting, by the base station, data to the one or more receivers.

In an additional aspect of the disclosure, a method of wireless communication includes receiving, by a UE, a data pre-grant request followed by a downlink reference signal from one or more base stations, wherein the UE processes the data pre-grant request during the receiving the downlink reference signal, transmitting, by the UE, an uplink channel reservation signal to a target base station of the one or more base stations, wherein the UE processes the downlink reference signal during the transmitting the uplink channel reservation signal, transmitting, by the UE, a data pre-grant acknowledgement followed by an uplink reference signal to the target base station, receiving, by the UE, one or more downlink channel reservation signals from the one or more base stations, and receiving, by the UE, data from the target base station, wherein the one or more downlink channel reservation signals are processed during the receiving the data.

In one aspect of the disclosure, a channel reservation system for scheduling transmissions on a shared radio medium that is shared by a plurality of licensed network operators is disclosed. An example system determines whether priority access to time slots of the shared radio medium has been assigned to a network at that time and based on the determination, reduces contention of access to the shared radio medium by performing a hand-shaking operation.

An example hand-shaking operation can include an apparatus configured for wireless communication including means for obtaining, at a transmitter, a contention pre-grant request including a schedule of communication between the transmitter and one or more receivers, means for transmitting, by the transmitter, a transmitter channel reservation signal identifying an intent to transmit data to one or more target receivers associated with the communication and a transmission power level intended for the data transmission, wherein the one or more target receivers are one or more of the one or more receivers, means for receiving, at the transmitter, one or more receiver channel reservation signals from the one or more receivers, wherein the one or more receiver channel reservation signals identifies an intent to receive, a receive transmit power level of the receiver channel reservation signal, and a maximum interference level acceptable of each of the one or more receivers, means for determining, by the transmitter, an interference level expected at each of the one or more receivers based on the transmission power level during the data transmission, and means for managing transmission, by the transmitter, of the data based at least in part on comparison of the interference level and the maximum interference level.

In an additional aspect of the disclosure, an apparatus configured for wireless communication includes means for obtaining, at a receiver, a pre-grant schedule of communication between the receiver and a target transmitter of one or more transmitters, means for transmitting, by the receiver, a receiver channel reservation signal identifying an intention to receive data associated with the communication, a receiver transmission power level of the receiver channel reservation signal, and a maximum interference level acceptable at the receiver, means for receiving, at the receiver, one or more transmitter channel reservation signals, wherein the one or more transmitter channel reservation signals identifies an intent to transmit and a transmission power level of each of the one or more transmitters, means for determining, by the receiver, an interference level expected at the receiver based on the transmission power level of the one or more transmitters, and means for managing reception, at the receiver, of the data based at least in part on the interference level.

In an additional aspect of the disclosure, an apparatus configured for wireless communication includes means for transmitting, by a base station, a data pre-grant for data transmission on a first frequency location to one or more UEs, means for transmitting, by the base station, a contention pre-grant on a second frequency location to the one or more UEs, means for receiving, at the base station, a pre-grant acknowledgement on an uplink transmission from the one or more UEs, means for performing contention resolution, by the base station, during a contention period of a current slot, and means for transmitting data from the base station to the one or more UEs in response to detecting success of the contention resolution.

In one aspect of the disclosure, a channel reservation apparatus configured for scheduling transmissions on a shared radio medium that is shared by a plurality of licensed network operators is disclosed. An example apparatus determines whether priority access to time slots of the shared radio medium has been assigned to a network at that time and based on the determination, reduces contention of access to the shared radio medium by performing a hand-shaking operation.

An example hand-shaking operation can include an apparatus configured for wireless communication including means for transmitting, by a base station, a data pre-grant request followed by a downlink reference signal to one or more UEs, means for receiving, at the base station, one or more uplink channel reservation signals from the one or more UEs, means for receiving, at the base station, one or more data pre-grant acknowledgements followed by one or more uplink reference signals from the one or more UEs after the means for receiving the one or more uplink channel reservation signals, wherein the one or more uplink channel reservation signals are processed during execution of the means for receiving the one or more data pre-grant acknowledgments and the one or more uplink reference signals, means for transmitting, by the base station, a downlink channel reservation signal to the one or more receivers, and means for transmitting, by the base station, data to the one or more receivers.

In an additional aspect of the disclosure, an apparatus configured for wireless communication includes means for receiving, by a UE, a data pre-grant request followed by a downlink reference signal from one or more base stations, wherein the UE processes the data pre-grant request during the receiving the downlink reference signal, means for transmitting, by the UE, an uplink channel reservation signal to a target base station of the one or more base stations, wherein the UE processes the downlink reference signal during execution of the means for transmitting the uplink channel reservation signal, means for transmitting, by the UE, a data pre-grant acknowledgement followed by an uplink reference signal to the target base station, means for receiving, by the UE, one or more downlink channel reservation signals from the one or more base stations, and means for receiving, by the UE, data from the target base station, wherein the one or more downlink channel reservation signals are processed during execution of the means for receiving the data.

In one aspect of the disclosure, a non-transitory computer-readable medium having program code recorded thereon includes code to schedule transmissions on a shared radio medium that is shared by a plurality of licensed network operators is disclosed. Example program code determines whether priority access to time slots of the shared radio medium has been assigned to a network at that time and based on the determination, reduces contention of access to the shared radio medium by performing a hand-shaking operation.

An example hand-shaking operation can include code configured to obtain, at a transmitter, a contention pre-grant request including a schedule of communication between the transmitter and one or more receivers, code to transmit, by the transmitter, a transmitter channel reservation signal identifying an intent to transmit data to one or more target receivers associated with the communication and a transmission power level intended for the data transmission, wherein the one or more target receivers are one or more of the one or more receivers, code to receive, at the transmitter, one or more receiver channel reservation signals from the one or more receivers, wherein the one or more receiver channel reservation signals identifies an intent to receive, a receive transmit power level of the receiver channel reservation signal, and a maximum interference level acceptable of each of the one or more receivers, code to determine, by the transmitter, an interference level expected at each of the one or more receivers based on the transmission power level during the data transmission, and code to manage transmission, by the transmitter, of the data based at least in part on comparison of the interference level and the maximum interference level.

In an additional aspect of the disclosure, a non-transitory computer-readable medium having program code recorded thereon includes code to obtain, at a receiver, a pre-grant schedule of communication between the receiver and a target transmitter of one or more transmitters, code to transmit, by the receiver, a receiver channel reservation signal identifying an intention to receive data associated with the communication, a receiver transmission power level of the receiver channel reservation signal, and a maximum interference level acceptable at the receiver, code to receive, at the receiver, one or more transmitter channel reservation signals, wherein the one or more transmitter channel reservation signals identifies an intent to transmit and a transmission power level of each of the one or more transmitters, code to determine, by the receiver, an interference level expected at the receiver based on the transmission power level of the one or more transmitters, and code to manage reception, at the receiver, of the data based at least in part on the interference level.

In an additional aspect of the disclosure, a non-transitory computer-readable medium having program code recorded thereon includes code to transmit, by a base station, a data pre-grant for data transmission on a first frequency location to one or more UEs, code to transmit, by the base station, a contention pre-grant on a second frequency location to the one or more UEs, code to receive, at the base station, a pre-grant acknowledgement on an uplink transmission from the one or more UEs, code to perform contention resolution, by the base station, during a contention period of a current slot, and code to transmit data from the base station to the one or more UEs in response to detecting success of the contention resolution.

In an additional aspect of the disclosure, a non-transitory computer-readable medium having program code recorded thereon includes code to transmit, by a base station, a data pre-grant request followed by a downlink reference signal to one or more UEs, code to receive, at the base station, one or more uplink channel reservation signals from the one or more UEs, code to receive, at the base station, one or more data pre-grant acknowledgements followed by one or more uplink reference signals from the one or more UEs after receiving the one or more uplink channel reservation signals, wherein the one or more uplink channel reservation signals are processed during execution of the code to receive the one or more data pre-grant acknowledgments and the one or more uplink reference signals, code to transmit, by the base station, a downlink channel reservation signal to the one or more receivers, and code to transmit, by the base station, data to the one or more receivers.

In an additional aspect of the disclosure, a non-transitory computer-readable medium having program code recorded thereon includes code to receive, by a UE, a data pre-grant request followed by a downlink reference signal from one or more base stations, wherein the UE processes the data pre-grant request during execution of the code to receive the downlink reference signal, code to transmit, by the UE, an uplink channel reservation signal to a target base station of the one or more base stations, wherein the UE processes the downlink reference signal during execution of the code to transmit the uplink channel reservation signal, code to transmit, by the UE, a data pre-grant acknowledgement followed by an uplink reference signal to the target base station, code to receive, by the UE, one or more downlink channel reservation signals from the one or more base stations, and code to receive, by the UE, data from the target base station, wherein the one or more downlink channel reservation signals are processed during execution of the code to receive the data.

In an additional aspect of the disclosure, an apparatus configured for wireless communication is disclosed. The apparatus includes at least one processor, and a memory coupled to the processor. The processor is configured to obtain, at a transmitter, a contention pre-grant request including a schedule of communication between the transmitter and one or more receivers, to transmit, by the transmitter, a transmitter channel reservation signal identifying an intent to transmit data to one or more target receivers associated with the communication and a transmission power level intended for the data transmission, wherein the one or more target receivers are one or more of the one or more receivers, to receive, at the transmitter, one or more receiver channel reservation signals from the one or more receivers, wherein the one or more receiver channel reservation signals identifies an intent to receive, a receive transmit power level of the receiver channel reservation signal, and a maximum interference level acceptable of each of the one or more receivers, to determine, by the transmitter, an interference level expected at each of the one or more receivers based on the transmission power level during the data transmission, and to manage transmission, by the transmitter, of the data based at least in part on comparison of the interference level and the maximum interference level.

In an additional aspect of the disclosure, an apparatus configured for wireless communication is disclosed. The apparatus includes at least one processor, and a memory coupled to the processor. The processor is configured to obtain, at a receiver, a pre-grant schedule of communication between the receiver and a target transmitter of one or more transmitters, to transmit, by the receiver, a receiver channel reservation signal identifying an intention to receive data associated with the communication, a receiver transmission power level of the receiver channel reservation signal, and a maximum interference level acceptable at the receiver, to receive, at the receiver, one or more transmitter channel reservation signals, wherein the one or more transmitter channel reservation signals identifies an intent to transmit and a transmission power level of each of the one or more transmitters, to determine, by the receiver, an interference level expected at the receiver based on the transmission power level of the one or more transmitters, and to manage reception, at the receiver, of the data based at least in part on the interference level.

In an additional aspect of the disclosure, an apparatus configured for wireless communication is disclosed. The apparatus includes at least one processor, and a memory coupled to the processor. The processor is configured to transmit, by a base station, a data pre-grant for data transmission on a first frequency location to one or more UEs, to transmit, by the base station, a contention pre-grant on a second frequency location to the one or more UEs, to receive, at the base station, a pre-grant acknowledgement on an uplink transmission from the one or more UEs, to perform contention resolution, by the base station, during a contention period of a current slot, and to transmit data from the base station to the one or more UEs in response to detecting success of the contention resolution.

In an additional aspect of the disclosure, an apparatus configured for wireless communication is disclosed. The apparatus includes at least one processor, and a memory coupled to the processor. The processor is configured to transmit, by a base station, a data pre-grant request followed by a downlink reference signal to one or more UEs, to receive, at the base station, one or more uplink channel reservation signals from the one or more UEs, to receive, at the base station, one or more data pre-grant acknowledgements followed by one or more uplink reference signals from the one or more UEs after receiving the one or more uplink channel reservation signals, wherein the one or more uplink channel reservation signals are processed during execution of the configuration of the at least one processor to receive the one or more data pre-grant acknowledgments and the one or more uplink reference signals, to transmit, by the base station, a downlink channel reservation signal to the one or more receivers, and to transmit, by the base station, data to the one or more receivers.

In an additional aspect of the disclosure, an apparatus configured for wireless communication is disclosed. The apparatus includes at least one processor, and a memory coupled to the processor. The processor is configured to receive, by a UE, a data pre-grant request followed by a downlink reference signal from one or more base stations, wherein the UE processes the data pre-grant request during execution of the configuration of the at least one processor to receive the downlink reference signal, to transmit, by the UE, an uplink channel reservation signal to a target base station of the one or more base stations, wherein the UE processes the downlink reference signal during execution of the configuration of the at least one processor to transmit the uplink channel reservation signal, to transmit, by the UE, a data pre-grant acknowledgement followed by an uplink reference signal to the target base station, to receive, by the UE, one or more downlink channel reservation signals from the one or more base stations, and to receive, by the UE, data from the target base station, wherein the one or more downlink channel reservation signals are processed during execution of the configuration of the at least one processor to receive the data.

Other aspects, features, and embodiments of the present invention will become apparent to those of ordinary skill in the art, upon reviewing the following description of specific, exemplary embodiments of the present invention in conjunction with the accompanying FIGS. While features of the present invention may be discussed relative to certain embodiments and FIGS. 1-16 below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended FIGS., similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
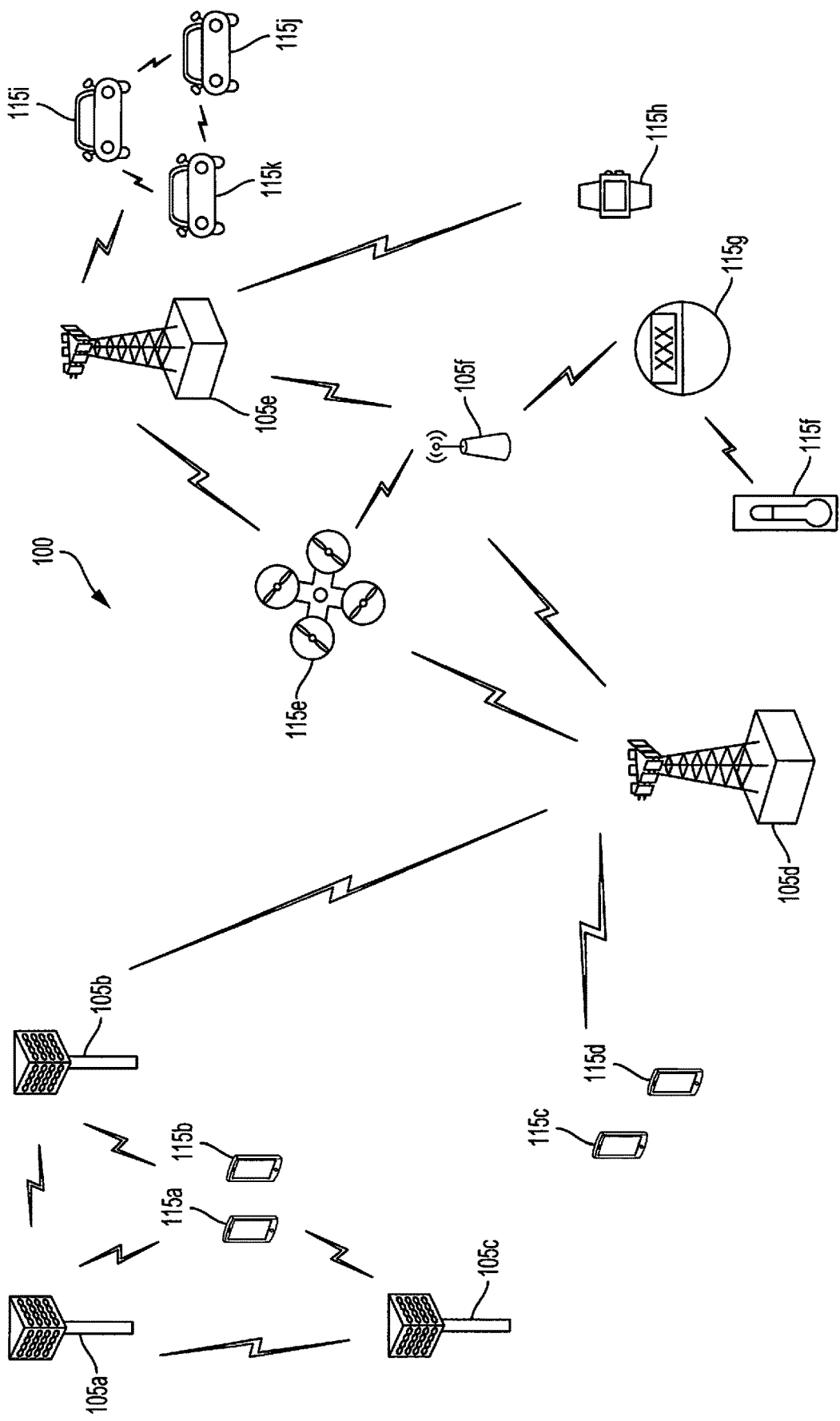
FIG. 1 is a block diagram illustrating details of a wireless communication system according to some embodiments of the present disclosure.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of evolved node Bs (eNBs) 105 and other network entities. An eNB may be a station that communicates with the UEs and may also be referred to as a base station, a an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105*d* and 105*e* are regular macro eNBs, while eNBs 105*a*-105*c* are macro eNBs enabled with one of 3 dimension (3D), full dimension (FD), or massive MIMO. eNBs 105*a*-105*c* take advantage of their higher dimension MIMO capabilities to exploit 3D beamforming in both elevation and azimuth beamforming to increase coverage and capacity. eNB 105*f* is a small cell eNB which may be a home node or portable access point. An eNB may support one or multiple (e.g., two, three, four, and the like) cells.

The 5G network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115*a*-

115*d* are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the eNBs, whether macro eNB, small cell, or the like. In FIG. 1, a lightning bolt (e.g., communication links) indicates wireless transmissions between a UE and a serving eNB, which is an eNB designated to serve the UE on the downlink and/or uplink, or desired transmission between eNBs, and backhaul transmissions between eNBs.

In operation at 5G network 100, eNBs 105*a*-105*c* serve UEs 115*a* and 115*b* using 3D beamforming and coordinated spatial techniques, such as coordinated multipoint (CoMP) or multi-connectivity. Macro eNB 105*d* performs backhaul communications with eNBs 105*a*-105*c*, as well as small cell, eNB 105*f*. Macro eNB 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also supports mission critical communications with ultra-reliable and redundant links for mission critical devices, such UE 115*e*, which is a drone. Redundant communication links with UE 115*e* include from macro eNBs 105*d* and 105*e*, as well as small cell eNB 105*f*. Other machine type devices, such as UE 115*f* (thermometer), UE 115*g* (smart meter), and UE 115*h* (wearable device) may communicate through 5G network 100 either directly with base stations, such as small cell eNB 105*f*, and macro eNB 105*e*, or in multi-hop configurations by communicating with another user device which relays its information to the network, such as UE 115*f* communicating temperature measurement information to the smart meter, UE 115*g*, which is then reported to the network through small cell eNB 105*f*. 5G network 100 may also provide additional network efficiency through dynamic, low-latency TDD/FDD communications, such as in a vehicle-to-vehicle (V2V) mesh network between UEs 115*i*-115*k* communicating with macro eNB 105*e*.

Figure 2:
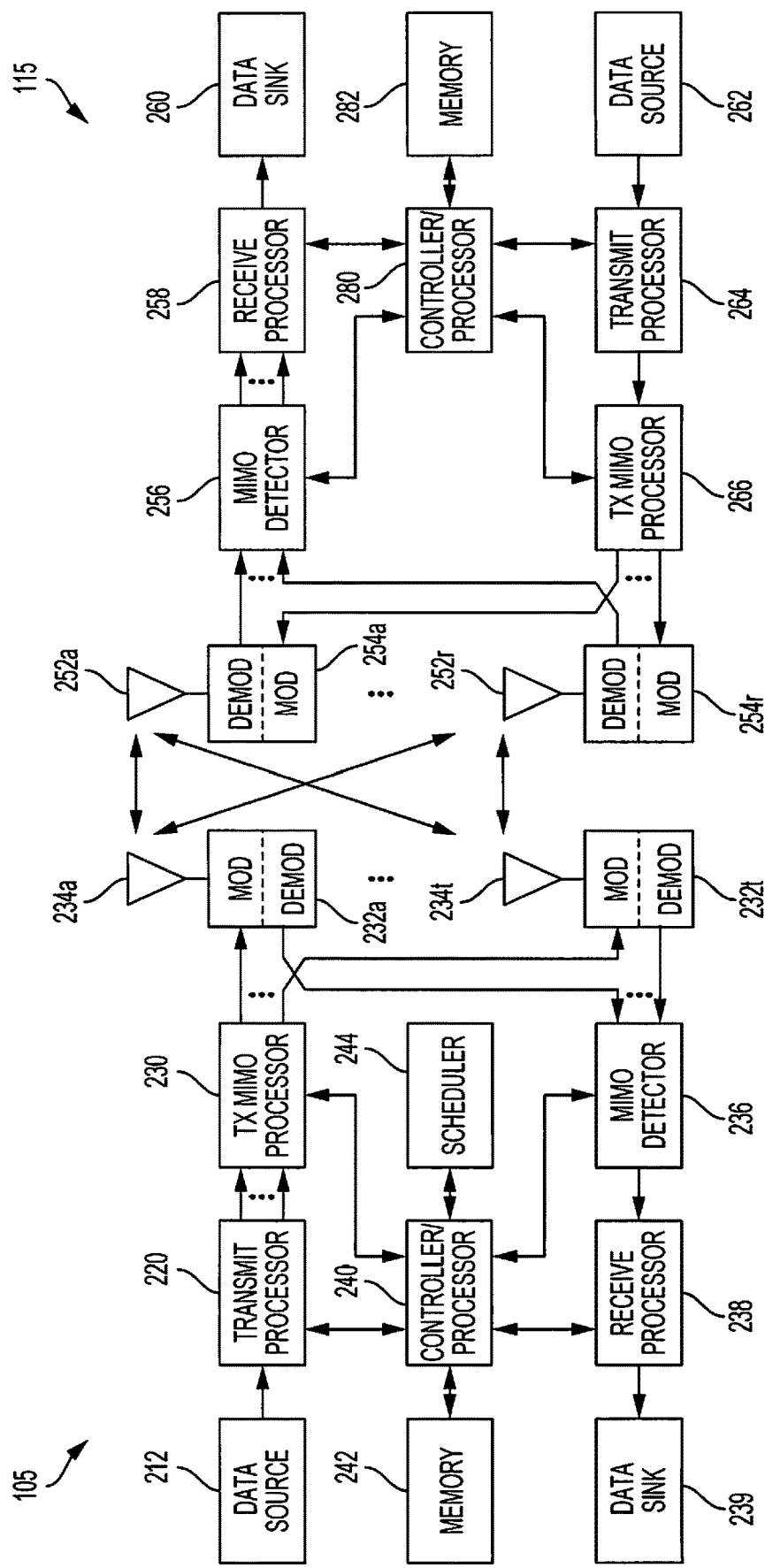
FIG. 2 is a block diagram conceptually illustrating a design of a base station/eNB and a UE configured according to some embodiments of the present disclosure.

FIG. 2 shows a block diagram of a design of base station/eNB 105 and UE 115, which may be one of the base stations/eNBs and one of the UEs in. For a restricted association scenario, the eNB 105 may be small cell eNB in, and UE 115 may be UE, which in order to access small cell eNB, would be included in a list of accessible UEs for small cell eNB. eNB 105 may also be a base station of some other type. eNB 105 may be equipped with antennas 234*a* through 234*t*, and UE 115 may be equipped with antennas 252*a* through 252*r*.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from eNB 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 1, 3A-4D and/or other processes for the techniques described herein. Memories 242 and 282 may store data and program codes for eNB 105 and UE 115, respectively. Scheduler 244 may schedule UEs for data transmission on the downlink and/or uplink.

Figure 3A:
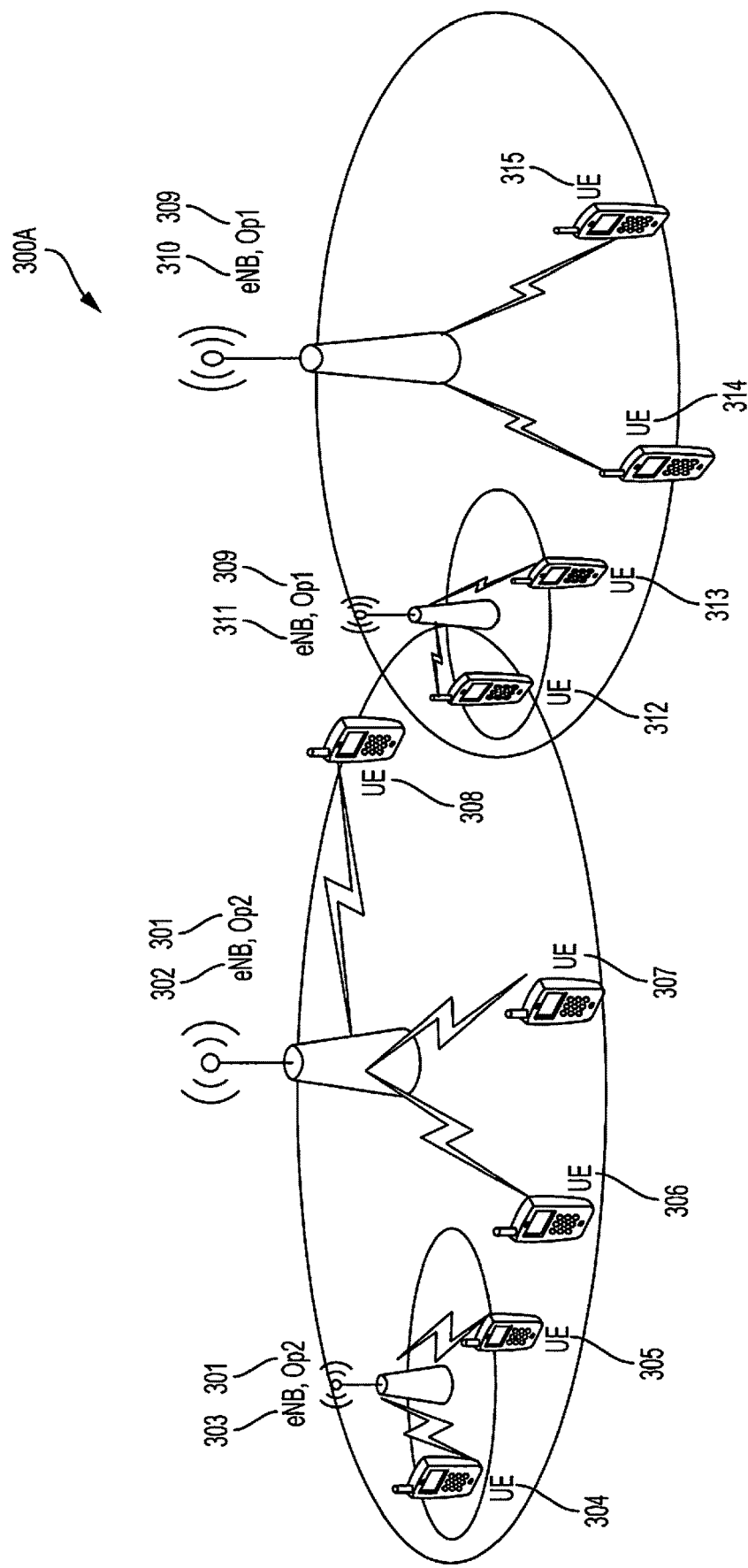
FIG. 3A is a block diagram, illustrating details of a wireless communication system according to some embodiments of the present disclosure.
Figure 3B:
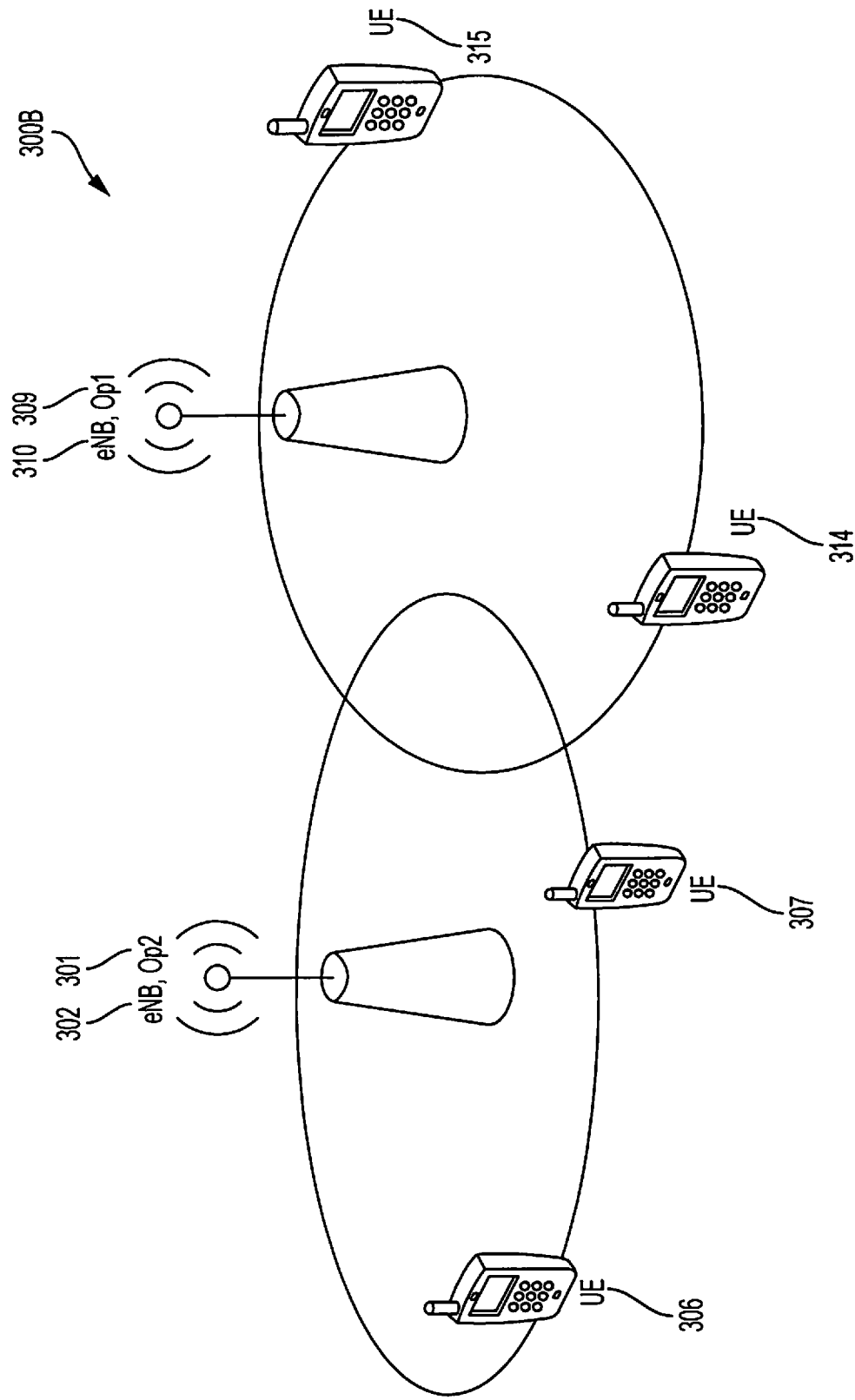
FIG. 3B is a block diagram, illustrating details of a wireless communication system according to some embodiments of the present disclosure.

FIGS. 3A and 3B show examples of the competitive environments described above. FIG. 3A illustrates a heterogeneous deployment 300A wherein four eNBs being operated by two operators are sharing medium access. Operator one (Op1) 301 is transmitting data using more powerful eNB 302 and less powerful eNB 303. Less powerful eNB 303 is transmitting data to UE 304 and UE 305. More powerful eNB 302 is transmitting data to UE 306, UE 307, and UE 308. In this example, eNB 303 can be configured as a victim node, and eNB 302 can be configured as an aggressor node. In this embodiment, the unique reservation technique employs the use of new radio channel reservation signals at least to protect less powerful transmissions of victim eNB 303 from the more powerful transmissions of aggressor eNB 302. In this example, victim node 303 will be given priority access to the shared radio medium in a time-sharing fashion as compared to aggressor node 302. Heterogeneous deployment 300A also includes operator two (Op2) 309, which is transmitting data using more powerful eNB 310 and less powerful eNB 311. In this example, eNB 311 can be configured as a victim node, and eNB 310 can be configured as an aggressor node. Less powerful eNB 311 is transmitting data to UE 312 and UE 313. More powerful eNB 310 is transmitting data to UE 314 and UE 315. In this embodiment, the unique reservation technique employs the use of new radio channel reservation signals at least to protect less powerful transmissions of victim eNB 311 from the more powerful transmissions of aggressor eNB 310. In this example, victim node 311 will be given priority access to the shared radio medium in a time-sharing fashion as compared to aggressor node 310.

Moreover, in this example, Op1 301 is assigned to a higher priority class than operator 309. The higher priority class may have been assigned to Op1 based on Op1's quality of service requirements. In this embodiment, the unique reservation technique employs the use of new radio channel reservation signals at least to prioritize data transmissions assigned to the comparatively higher priority class. In short, data transmissions assigned a comparatively higher priority class will be giving priority to accessing the radio medium in a time-sharing fashion as compared to data transmissions assigned to a comparatively lower priority class. In this example, Op1 will be given priority access to the shared radio medium in a time-sharing fashion as compared to Op2. According to the above, the access priorities of the shared medium will be as follows: Op1 eNB 311 has higher priority access than Op1 eNB 310, which has higher priority access than Op2 eNB 303, which has higher priority access than Op2 eNB 302. In other examples, the order of priority access can be dynamically changed by RRC signaling and/or update of system information.

FIG. 3B illustrates a simpler heterogeneous deployment 300B wherein two operators are sharing medium access. The reference numbers of FIG. 3B correspond with the references numbers of FIG. 3A for the sake of clarity. Heterogeneous deployment 300B will be used to describe frame and subframe structures below because FIG. 3B's lack of complexity makes the frame structures easier to understand.

Op1 309 is transmitting using eNB 310, which communicates with UE 314 and UE 315. Op2 301 is transmitting using eNB 302, which communicates with UE 306 and UE 307. The operators may have different quality of service requirements and as such have been assigned to different priority classes. In this example, Op1 309 is assigned to a higher priority class than Op2 301. In this embodiment, the unique reservation technique employs the use of new radio channel reservation signals at least to prioritize medium access for data transmissions of a higher priority class. In short, data transmissions assigned a higher priority class will be giving priority to accessing the radio medium in a time-sharing fashion as compared to data transmissions assigned to a lower priority class. Thus, data transmissions are prioritized as explained above, and the prioritization determines how the radio medium will be occupied in a time-sharing fashion. In other example, eNB 310 may be configured as a victim node and eNB 302 may be configured as an aggressor node, based on the respective nodes' transmission power. Regardless the specific reason for eNB 310's priority classification, in the present example, eNB 310 will be afforded priority access to the shared medium as compared to eNB 302.

In embodiments, occupancy of the radio medium is reserved and scheduled by channel reservation signals, which are transmitted within dedicated time slots of frames and/or subframes. The channel reservation signals may include a LBT preamble, a reservation request (RRQ) signal, and a reservation response (RRS) signal. For example, a listen before talk (LBT) preamble may be transmitted on DL and/or UL within an LBT slot allocated to the specific eNB that is performing the transmitting. Following the LBT preamble transmission, a RRQ signal followed by a RRS signal may be transmitted. The LBT preamble, RRQ, and RRS all correspond to the same eNB and may be transmitted on the DL and/or UL within their respective dedicated time slots. In some embodiments, the LBT preamble may be omitted. Allocation of the TDM slots for channel reservation signals are ordered according to the prioritization explained above (e.g., based on the assigned priority class and/or power class). For example, higher priority class Op1 309 is allocated TDM slots for channel reservation signals before lower priority class Op2 301 is allocated slots for channel reservation signals.

Figure 3C:
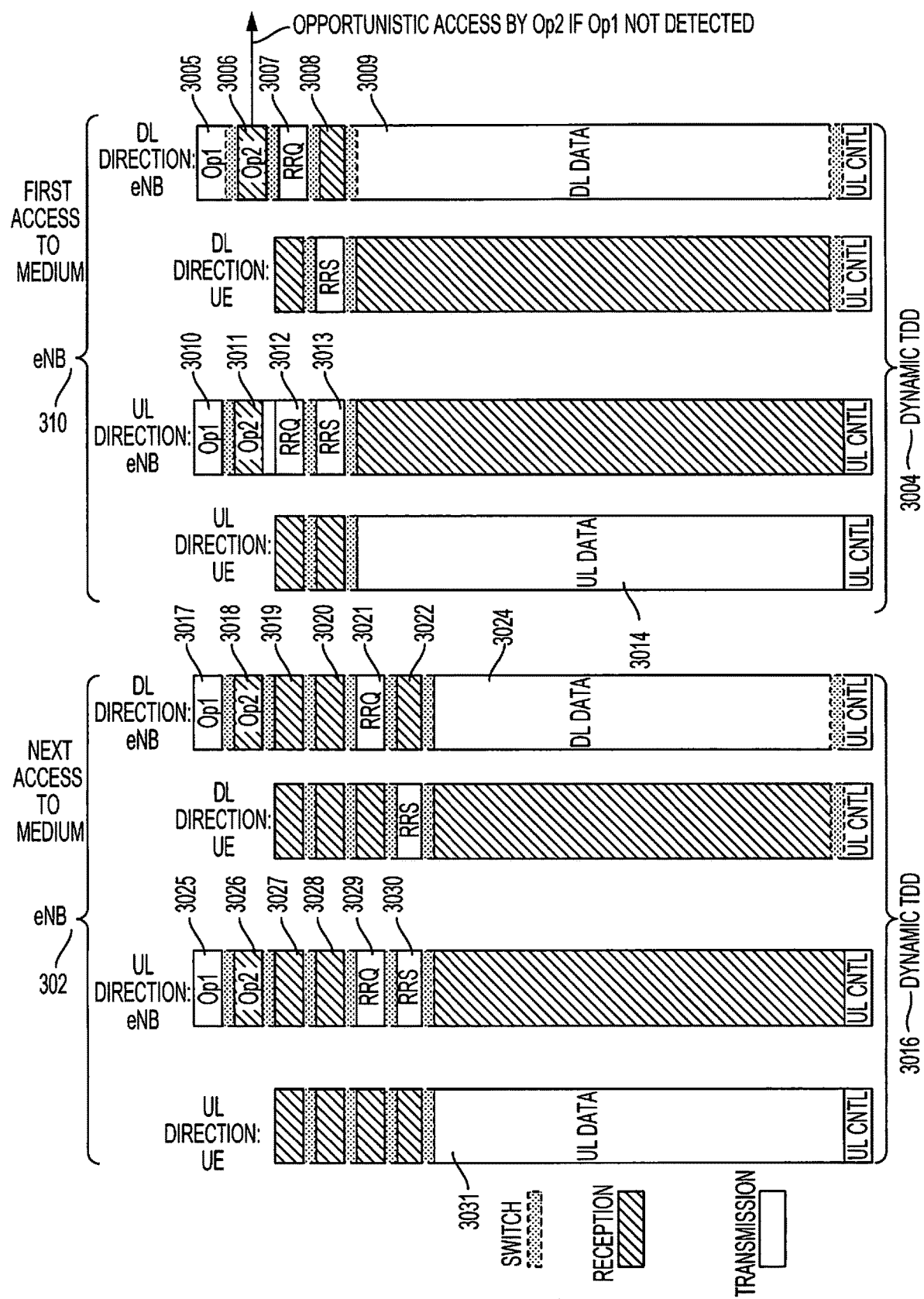
FIG. 3C is a block diagram, illustrating details of frame and subframe structures according to some embodiments of the present disclosure.

FIG. 3C illustrates an example of the frame and/or subframe structures used based on dynamic TDD, wherein the radio medium is dynamically shared by multiple nodes (and/or operators) and the split of the uplink transmission and the downlink transmission of the frame can be done in a dynamic way. FIG. 3C illustrates two eNBs sharing a radio medium and corresponds to the two operators (Op1 309 and Op2 301) transmitting using the two eNBs (eNB 310 and eNB302) of FIG. 3B. Any number of nodes could be sharing the illustrated frames, but to simplify the following explanation, only two nodes are shown. eNB 310 is a node which is allocated TDM slots for channel reservation signals ahead of eNB 302. In this example, eNB 310 is classified as having a higher priority while eNB 302 is classified as having a comparatively lower priority. In other embodiments, eNB 310 may be a node that is classified as a victim eNB while eNB 302 is classified as an aggressor eNB. Regardless the reason for the allocation, eNB 310 is allocated first access to the radio medium and eNB 302 is the next priority access to the radio medium.

Dynamic TDD frame 3004 is an example frame wherein eNB 310 of Op1 309 transmits data. For the DL direction of frame 3004, eNB 310 transmits an LBT preamble in its assigned time slot 3005 indicating that eNB 310 desires to schedule a DL data transmission. During time slot 3006, if eNB 302 of Op2 301 detects a LBT preamble sent by higher priority eNB 310 in slot 3005, eNB 302 refrains from sending an LBT preamble during time slot 3006. Because eNB 310 transmitted during slot 3005, eNB 302 keeps quiet during slot 3006 and prevents interference.

Thereafter, eNB 310 transmits an RRQ signal in its assigned time slot 3007 requesting a DL channel reservation to be made so that its DL data transmission can be scheduled. The RRQ signal can take the form of a full grant (e.g., Physical Downlink Control Channel (PDCCH)) or a pre-grant (light-weight PDCCH). Further details regarding the contents of RRQ signals are provided later in this disclosure. Thereafter, the target UE sends eNB 310 an RRS signal in its assigned time slot 3008 in response to the detected RRQ signal sent in 3007. The RRS signal may be meant for medium reservation/arbitration, which is not necessarily dependent on the resource allocation for user-specific data transmission. Further details regarding the contents of RRS signals are provided later in this disclosure. Then, eNB 310 transmits the DL data to the target UE in time slot 3009. Time slot 3009 was reserved for the DL data transmission according to the RRQ/RRS signals dedicated for DL channel reservation by eNB 310. eNB 302 listens for the RRQ and/or RRS signals of other nodes in time slots 3007 and 3008. In this example, eNB 302 detected the RRQ and/or RRS signals of eNB 310. As a result of detecting the RRQ and/or RRS signals of eNB 310, eNB 302 did not attempt to send an RRQ, an RRS or DL data in time slot 3009. In short, eNB 302 detected a higher priority eNB's RRQ and/or RRS signals, and based on the detecting, stayed quiet. Because eNB 302 stayed quiet, eNB 310 did not fall victim or otherwise experience interference from aggressor nodes, which include eNB 302 and the UEs camping on eNB 302 (for example, UE 306 and UE 307).

Dynamic TTD frame 3004 also includes UL direction transmissions. In the UL direction, eNB 310 transmits an LBT preamble during its assigned time slot 3010 indicating the eNB 310 desires to schedule an UL data transmission. During time slot 3011, if eNB 302 of Op2 301 detects the LBT preamble sent by higher priority eNB 310 in slot 3010, eNB 302 refrains from sending an LBT preamble during time slot 3011. Because eNB 310 transmitted during slot 3010, eNB 302 keeps quiet during slot 3011 and prevents interference.

Thereafter, eNB 310 transmits an RRQ signal in its assigned time slot 3012 requesting a UL channel reservation to be made so its UL data transmission can be scheduled. Thereafter, the eNB 310 sends the target UE an RRS signal in its assigned time slot 3013, which results in UL channel reservation for time slot 3014, and arbitration and scheduling of the UL data transmission. Since the data transmission is now scheduled, the UE transmits the UL data in time slot 3014. Time slot 3014 was reserved for the UL data transmission according to the RRQ/RRS signals. eNB 302 and the UEs camping on eNB 302 (for example, UE 314 and UE 315) are operable to listen for the RRQ and/or RRS signals of other higher priority nodes such as eNB 310. In this example, eNB 302, UE 314, and UE 315 detected the RRQ and/or RRS signals of eNB 310. As a result of the detecting, eNB 302, UE 314, and UE 315 did not attempt to receive or transmit UL data in time slot 3014. In short, eNB 302 and the UEs camping on eNB 302 detected eNB 310's RRQ and/or RRS signal, and based on the detecting, stayed quiet. Because eNB 302 and its camping UEs stayed quiet during this time slot, eNB 310 did not fall victim or otherwise experience interference from aggressor nodes, which include eNB 302 and the UEs camping on eNB 302.

In this time access dynamic TDD frame 3004, eNB 310 of Op1 309 is granted the first option to occupy a resource of the shared medium in order to transmit data. However, if eNB 310 has no data to transmit, eNB 310 is under no obligation to occupy resources of the shared medium. An example of this is shown in dynamic TDD frame 3016, wherein eNB 310 sends no LBT preamble, RRQ, RRS, or UL/DL In the embodiment of FIG. 3C, eNB 302 desires to send data; however, eNB 302 did not have the opportunity to send data during dynamic TDD frame 3004 because higher priority eNB 310 was transmitting data during dynamic TDD frame 3004. That being said, eNB 302 is afforded the opportunity to transmit data during dynamic TDD frame 3016 because higher priority eNB 310 is not transmitting data during dynamic TDD frame 3016.

Higher priority eNB 310 does not need to send a LBT preamble if it has no data to transmit. Thus, eNB 310 does not send a LBT preamble in time slot 3017 because eNB 310 has no transmission to schedule. Further, if eNB 310 has no data to send, eNB 310 does not need to transmit RRQ and RRS signals, and in this example, eNB 310 does not send RRQ and RRS signals in time slots 3019 and 3020, respectively.

During time slot 3017 of TDD frame 3016, eNB 302 of lower priority Op2 301 is operable to listen for a LBT preamble of Op1. If eNB 302 does not detect the existence of a LBT preamble sent by higher priority nodes in time slot 3017, and if eNB 302 has data to transmit, eNB 302 will first transmit a LBT preamble in time slot 3018 to signal the forthcoming RRQ and RRS signals for channel reservation in time slots 3021 and 3022, respectively. During time slots 3019 and 3020 of TDD frame 3016, lower priority eNB 302 is operable to listen for an RRQ and/or RRS of other nodes. In embodiments, eNB 302 listens for both RRQs and RRSs in order to provide enhanced detection reliability. Alternatively, eNB 302 may be operable to listen for RRQs or RRSs from other nodes, but not both, as a means to save power and processing resources. Of course any of the eNBs may be dynamically configurable to listen for RRQs and/or RRSs according to any of the three variations described above, and the various eNBs may be configured differently from each other according to their needs at that time.

In this example, eNB 302 is configured to listen for RRSs rather than RRQs, as a means to save power and processing resources. As such, eNB 302 does not expend resources listening for the transmission of a RRQ during time slot 3019. eNB 302 does listen for the transmission of RRSs, and during time slot 3020, eNB 302 listens for an RRS of another node (e.g., a node of higher access priority). In this example, eNB 302 does not detect an RRS during time slot 3020. The lack of detection indicates to eNB 302 that resources are available on the shared medium whereby eNB 302 can transmit DL data. Based on eNB 302 determining that an RRS was not transmitted during time slot 3020, eNB 302 transmits to a target UE an RRQ during time slot 3021 indicating the desire to schedule DL data transmission in time slot 3024. In response to the transmitted RRQ, the UE transmits a RRS during time slot 3022, which results in DL channel reservation for time slot 3024, as well as arbitration and scheduling of the DL data transmission in time slot 3024. Then, during time slot 3024, eNB 302 transmits DL data to the UE. Because eNB 310 had no desire to send data during time slot 3024, eNB 302 was able to use the shared resource to send DL data without victimizing or otherwise interfering with eNB 310 and its camping UEs (for example, UE 314 and UE 315).

Dynamic TDD frame 3016 also comprises UL data for eNB 302. In this example, eNB 310 has no data to transmit and gives up the opportunity to send an LBT preamble during time slot 3025. Further, eNB 310 does not transmit a RRQ signal in time slot 3027, or a RRS signal in time slot 3028. Likewise, if eNB 302 has data to transmit and if eNB 302 does not detect any LBT preamble from higher priority nodes in time slot 3025, eNB 302 sends an LBT preamble during time slot 3026. Thereafter, eNB 302 listens for the transmission of RRQ and/or RRS of another node (e.g., a higher priority node) during time slot 3027 and/or time slot 3028. If eNB 302 does not detect an RRQ or an RRS during time slot 3027 and 3028, eNB 302 transmits its own RRQ signal in time slot 3030. In response to determining that no RRQ of higher priority was transmitted during time slot 3027 and no RRS of higher priority was transmitted during time slot 3028, eNB 302 determines that resources for its channel reservation are available on the shared medium whereby eNB 302 can receive UL data from a UE. Due to the availability of resources on the shared medium for UL channel reservation and UL data transmission, eNB 302 transmits an RRQ during time slot 3029 requesting that an UL data transmission be scheduled (for UE 306 or UE 307 as an example). After transmitting the RRQ, eNB 302 transmits a RRS during time slot 3030, which results in arbitration and scheduling of the desired UL transmission in time slot 3031. Then, during time slot 3031, UE (for example UE 306 or UE 307) transmits UL data to eNB 302. Because eNB 310 has no desire to receive UL data during time slot 3031, eNB 302 was able to use the shared radio medium to receive UL data without victimizing or otherwise interfering with eNB 310 and its camping UEs (for example UE 314 or UE 315).

In short, aggressor nodes and/or lower priority class nodes are configured to monitor for channel reservation signals of victim nodes and/or higher priority nodes. Further, aggressor nodes and/or lower priority class nodes schedule their payload transmissions based on their monitoring of channel reservation signals of victim nodes and/or higher priority nodes. Channel reservation signals come in pairs (e.g., RRQ and RRS); the trigger signal RRQ is transmitted first, followed by the response signal RRS. As such, aggressor/low priority class nodes can monitor one of the pair of signals, or aggressor/low priority class nodes can perform early and/or joint detection by monitoring both of the pair of signals.

In the examples of FIG. 3C, medium sharing is based on TDMA and the RRQ is transmitted by its respective eNB. Further, depending on whether the communication is an UL or a DL, the RRS is transmitted by the eNB or UE, respectively. Further still, the RRQ requests scheduling of the UL/DL data transmission and the RRS handles medium reservation/arbitration, which is not necessarily dependent on the resource allocation for the user-specific data transmission. Still further, transmission and detection of RRQ and/or RRS can be adaptively employed according to priority class, resource availability, and capacity at the time in order to enhance the detection reliability of medium occupancy and/or reserve a eNB's processing resources.

Details of an RRQ signal will now be discussed. An RRQ will preferably be sent in a NR subframe prior to potential data transmission. The RRQ can be sent as a multi-cast signal or as a uni-cast signal. The information included within the RRQ may be limited to promote efficient signaling of the channel reservation information. The RRQ information may include the direction of the communication, such as an indication of whether the data is a UL transmission or a DL transmission. The information may include the priority class of the transmission and/or the power class of the transmission. The RRQ information may include the channel reservation time and may indicate the identities of victim nodes.

There may be at least two options for conveying the RRQ information. The RRQ signal may be a lightweight PDCCH or a configurable preamble sequence mapped to special or regular search space. The lightweight PDCCH may have a compact downlink control information (DCI) format. The lightweight PDCCH may have a cyclic redundancy check (CRC) that is based on a UE specific radio network temporary identifier (RNTI) or a group RNTI. If a group RNTI is used, the UE may have the corresponding bitmap. The bitmap and group RNTIs can be pre-configured by RRC signaling. In embodiments, the lightweight PDCCH may omit indications of a resource assignment, the modulation and coding scheme (MCS), identity of redundancy version (RVID), and/or hybrid automatic repeat request (HARQ). Alternatively, the RRQ signal may be a full PDCCH such as a full DL grant or full UL grant. Such a PDCCH may include MCS, resource assignment, RVID, NDI, HARQ, cell ID, and other information that is traditionally included in a full PDCCH. Table A below further details example RRQ signals.

TABLE A

| Trigger Type | Option A (Lightweight PDCCH in special search space) | Option B (PDCCH carrying full DL/UL grant) |
| --- | --- | --- |
| DL-RRQ | Compact DCI payload Mapped to common search space, or dedicated search space for DL trigger signal CRC calculation based on group RNTI Efficient signaling of DL burst duration, Priority class, URLLC, link direction (DL/UL), etc. | RRQ is a full PDCCH channel RRQ has the full grant and may include MCS, RB assignment, cell ID, RVID, NDI, HARQ etc. |
| UL-RRQ | Compact DCI payload Mapped to common search space, or dedicated search space for UL trigger signal CRC calculation based on new group RNTI Efficient signaling of UL burst duration, Cell ID, Priority class, URLLC, link direction (DL/UL), etc. | Similar design as DL-RRQ Orthogonal multiplexing with DL RRQ in time/frequency/code |

In embodiments, aggressor nodes and/or lower priority class nodes may be configured to monitor for RRQ signals to determine medium occupancy. Detection of an RRQ may be based on energy sensing, signal correlation, and joint processing in time-frequency domain, which can be supplemented by cell specific reference signal (CRS) detection. In addition, a preamble may be sent in the beginning of the RRQ for aggressor nodes and/or lower priority class nodes to enhance the reliability of detection.

Details of an RRS signal will now be discussed. RRS signals are sent by nodes to avoid potential interference with DL and/or UL data transmissions. RRSs may be transmitted on predefined resources, for example, a predefined set of tones. The resource may be assigned semi-statically and/or indicated dynamically. The resource may or may not be tied to a resource block (RB) assignment of the respective nodes. Multiple resources may be configured within the RRS, and the receive node may choose one from the configured resources. For example, an RRS signal can occupy a subset of contiguous RBs or a subset of distributed RBs in frequency domain. The time duration of an RRS signal can last multiple or a fraction of NR symbol duration. For example, $2^N$ resources may be configured and the receive node may choose one of the $2^N$ resources to deliver N bit information.

RRS signals may be multiplexed. In such multiplexing, RRSs of different power classes, priority classes, and/or operators will schedule transmissions for different time and/or frequency resources. In embodiments, the same resource (e.g., same set of tones) may be used among RRSs within the same power classes, priority classes, and/or operators. For example, when using the same resources, a single frequency network (SFN) transmission using identical sequences may be used. In an alternative embodiment, different sequences for different RRSs (e.g., scrambling based on UE identity or dynamic signally) may be used.

The design of the RRS signals allows for efficient signaling of limited information. For example, ultra-reliable low latency connection (URLLC) indication of data could be used for RRS transmissions. Further, information such as communication direction (UL/DL), power/priority class, cell ID etc. may be indirectly conveyed on the resource being used to transmit the RRS. Further still, additional efficiencies may be realized by having the downlink reservation response signal (DL RRS) reuse the channel state information reference signal (CSI-RS) waveform, and/or having the uplink reservation response signal (UL RRS) reuse the sounding reference signal (SRS) waveform. If reusing the reference signal waveforms is not desired, new RRS waveforms could be defined as is shown in table B below. In embodiments, the transmission power and/or detection thresholds for the RRS signals may be defined based on the different power classes, priority classes, and/or operators.

302d, if Op2 detects a LBT preamble in the previous LBT time slot allocated for Op1, Op2 refrains from sending a LBT preamble and keeps quiet. In step 303d, Op1 sends an RRQ during its assigned timeslot if it has DL data to transmit to its target UEs. In step 304d, due to the RRQ being transmitted, Op1 receives an RRS from its target UEs during its designated timeslot. Further, because Op2 is listening for the RRS of Op1, in step 304d, Op2 detects the RRS and refrains from transmission as a result. In step 305d, Op1 sends a DL transmission. Because Op2 remained quiet during step 305d, Op1's DL transmission experiences much less interference.

Figure 3D:
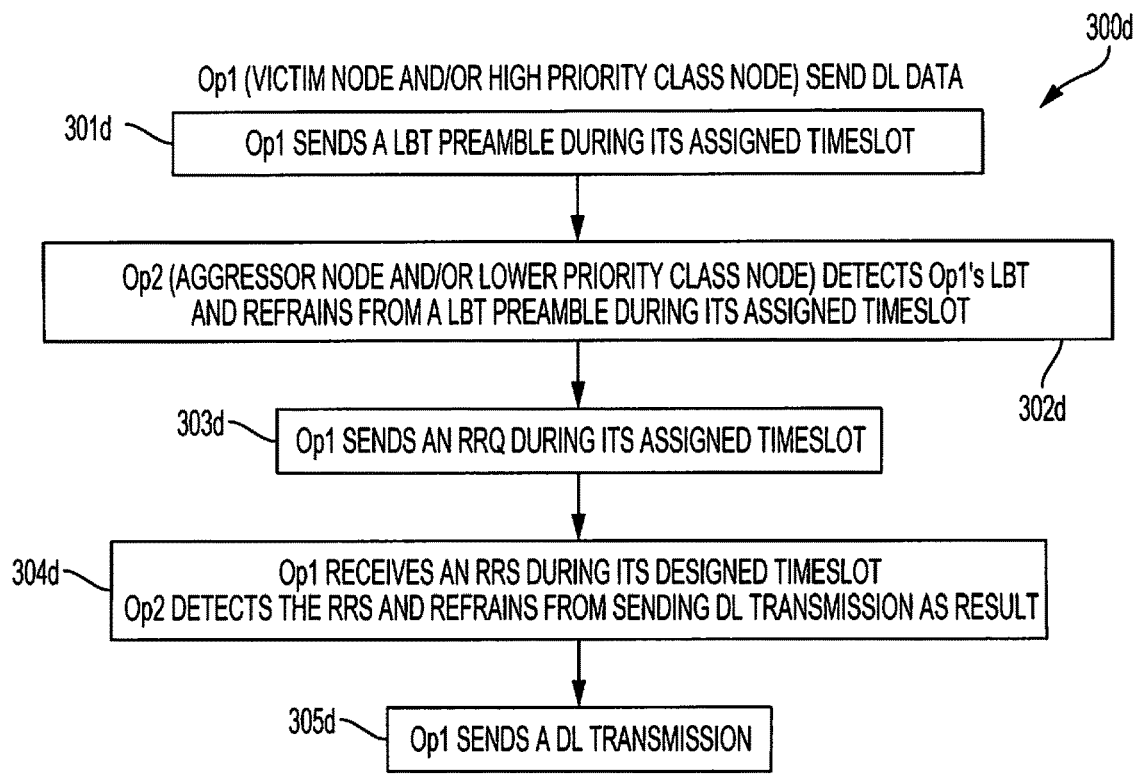
FIG. 3D is an example process according to some embodiments of the present disclosure.
Figure 3E:
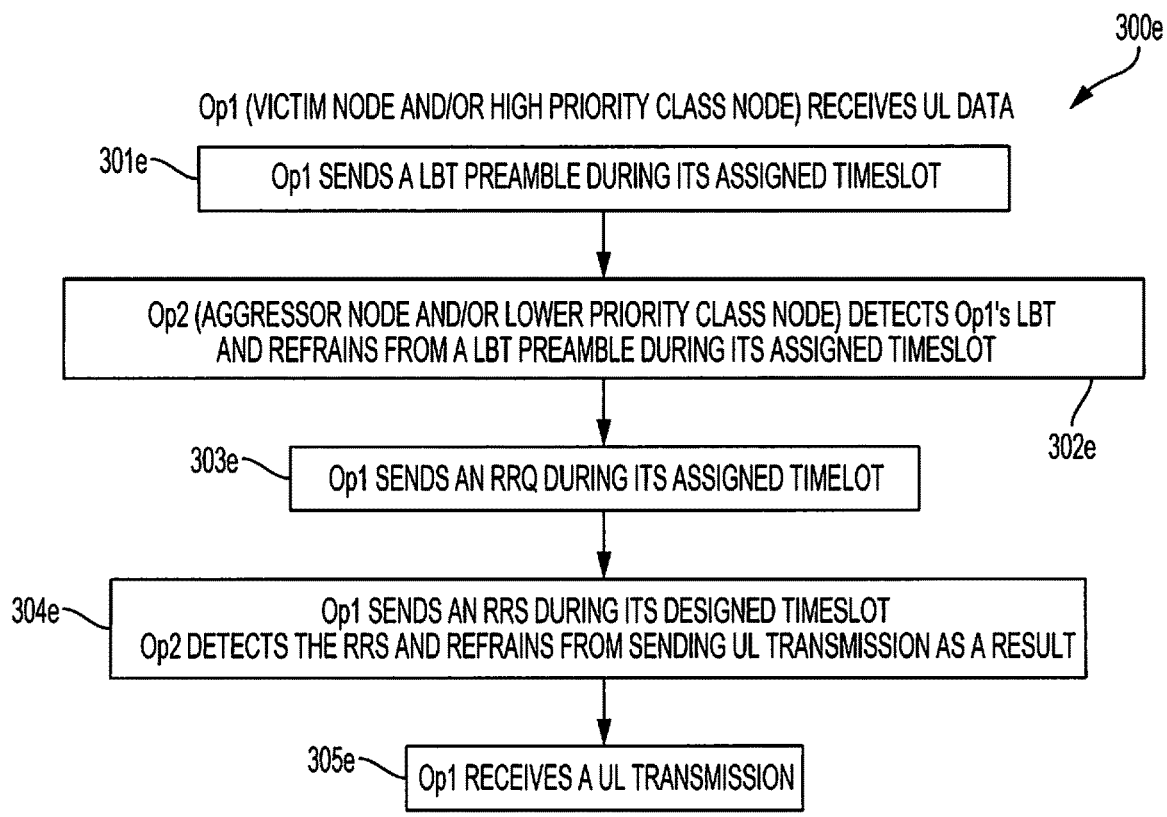
FIG. 3E is an example process according to some embodiments of the present disclosure.

FIG. 3E shows an example process flow 300e involving the apparatuses of FIG. 3B, wherein Op1 receives UL data. In this example, Op1 is transmitting using eNB 310, which has been classified as a victim node and/or a higher priority class node as compared to eNB 302. Further, Op2 is transmitting using eNB 302, which has been classified as an aggressor node and/or a lower priority class node as compared to eNB 310. In step 301e, Op1 sends a LBT preamble during its assigned timeslot if it has data to transmit on UL. In step 302e, if Op2 detects a LBT preamble in the previous LBT time slot allocated for Op1, Op2 refrains from sending a LBT preamble and keeps quiet. In step 303e, Op1 sends an RRQ during its assigned timeslot. In step 304e, due to the RRQ being transmitting, Op1 sends an RRS during its designated timeslot. In step 304e, Op2 detects the RRS and

TABLE B

| Response Type | Option A (Reference Signal) | Option B (Multi-tone Pilot with Configurable Parameters) |
|---|---|---|
| DL-RRS | Aperiodic SRS Sequence selection, scrambling, puncturing, or resource mapping for SRS follows a function parameterized on Cell ID, Priority class, URLLC, etc. | Multi-tone sequence with different hopping pattern and tone spacing (wideband or band-limited) Power boosting of pilot tones, plus dedicated null tones for noise/interference measurement Selection of {pilot hopping pattern, pilot tone spacing, null tone location} follows a mapping function parameterized on Cell ID, Priority class, URLLC, etc. SFN transmission with same or different sequence among victim UEs |
| UL-RRS | Aperiodic CSI-RS Sequence selection, scrambling, puncturing and/or resource mapping for CSI-RS follows a function parameterized on Cell ID, Priority class, URLLC, etc. | Similar design as DL-RRS Orthogonal multiplexing of UL and DL RRS in time/frequency SFN transmission with same or different sequence among victim nodes |

In embodiments, aggressor nodes and/or lower priority class nodes may be configured to monitor for RRS signals to determine medium occupancy. Detection of an RRS may be based on energy sensing, sequence correlation and/or joint processing in time-frequency domain. In addition, a preamble may be sent in the beginning of the RRS for aggressor nodes and/or lower priority class nodes to detect.

FIG. 3D shows an example process flow 300d involving the apparatuses of FIG. 3B, wherein Op1 sends DL data. In this example, Op1 is transmitting using eNB 310, which has been classified as a victim node and/or a higher priority class node as compared to eNB 302. Further, Op2 is transmitting using eNB 302, which has been classified as an aggressor node and/or a lower priority class node as compared to eNB 310. In step 301d, Op1 sends a LBT preamble during its assigned timeslot if it has data to transmit on DL. In step refrains from transmission as a result. In step 305e, Op1 receives a UL transmission. Because Op2 remained quiet during step 305e, Op1's UL transmission experiences much less interference.

Figure 3F:
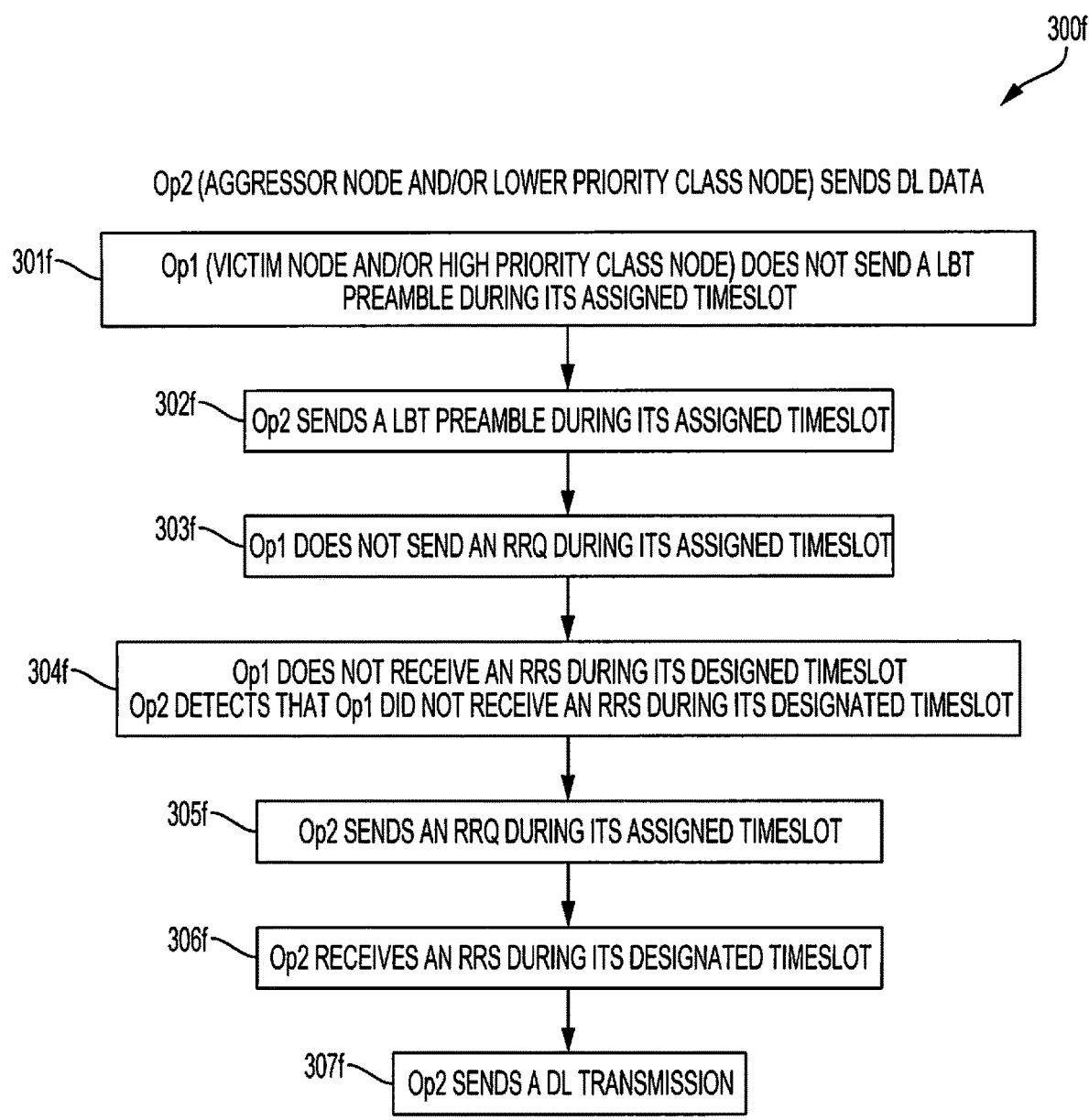
FIG. 3F is an example process according to some embodiments of the present disclosure.

FIG. 3F shows an example process flow 300f involving the apparatuses of FIG. 3B, wherein Op2 sends DL Data. In this example, Op1 is not transmitting using eNB 310, which has been classified as a higher priority class node as compared to eNB 302. Further, Op2 is transmitting using eNB 302, which has been classified as an aggressor and/or lower priority class node as compared to eNB 310. In step 301f, Op1 does not send a LBT preamble during its assigned timeslot since it has no data to transmit. In step 302f, Op2 sends a LBT preamble during its assigned timeslot because Op2 did not detect an LBT preamble of a higher priority node. In step 303f, Op1 does not desire to send DL data, so Op1 does not send an RRQ during its assigned timeslot. Because no RRQ was sent by Op1, in step 304*f*, Op1 does not receive an RRS during its designated timeslot from its UEs. Because Op2 is listening for Op1's RRS, in step 304*f*, Op2 detects that UEs of Op1 did not transmit an RRS during its designated timeslot, and thus determines that resources on the shared medium are available for transmission. In step 305*f*, Op2 sends an RRQ to its target UEs during its assigned timeslot. In step 306*f*, Op2 receives an RRS from its target UEs during its designated timeslot. In step 307*f*, Op2 sends a DL transmission. Because Op1 is not transmitting, Op2 is free to transmit without causing interference problems to Op1.

Figure 3G:
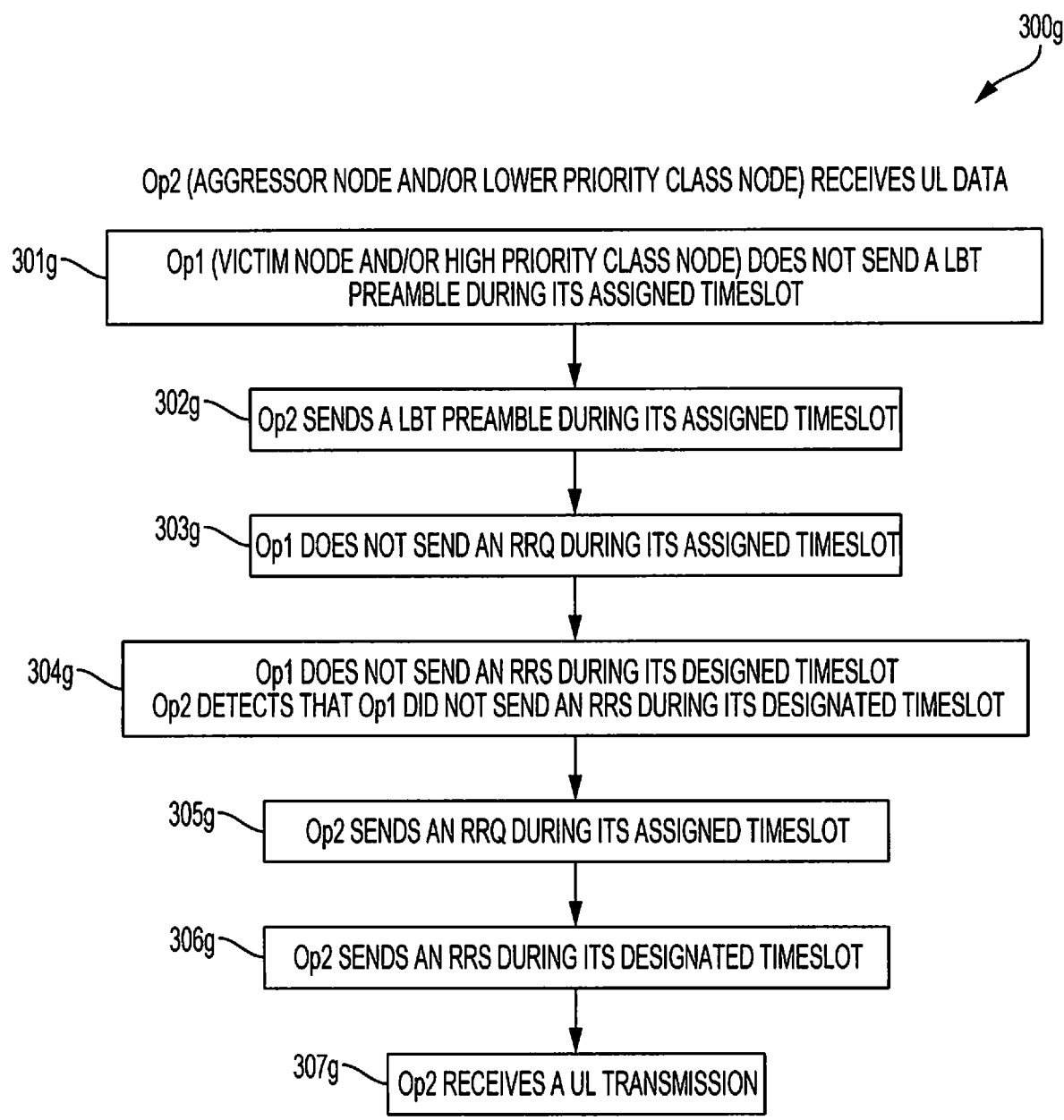
FIG. 3G is an example process according to some embodiments of the present disclosure.

FIG. 3G shows an example process flow 300*g* involving the apparatuses of FIG. 3B, wherein Op2 receives UL data. In this example, Op1 is not transmitting using eNB 310, which has been classified as a higher priority class node as compared to eNB 302. Further, Op2 is transmitting using eNB 302, which has been classified as an aggressor node and/or a lower priority class node as compared to eNB 310. In step 301*g*, Op1 does not send a LBT preamble during its assigned timeslot since it has no data to transmit. In step 302*g*, Op2 sends a LBT preamble during its assigned timeslot because Op2 did not detect an LBT preamble of a higher priority node. In step 303*g*, Op1 does not desire UL data, so Op1 does not send an RRQ during its assigned timeslot. Because Op1 did not send an RRQ, in step 304*d*, Op1 does not send an RRS during its designated timeslot. Because Op2 is listening for Op1's RRS, in step 304*g*, Op2 detects that Op1 did not send an RRS during its designated timeslot, which signals to Op2 that resources are available on the shared medium to transmit. In step 305*g*, Op2 sends an RRQ during its assigned timeslot. In step 306*g*, Op2 sends an RRS during its designated timeslot. In step 307*g*, Op2 receives UL transmission. Because Op1 is not transmitting, Op2 is free to receive transmissions without causing interference problems to Op1.

Figure 4A:
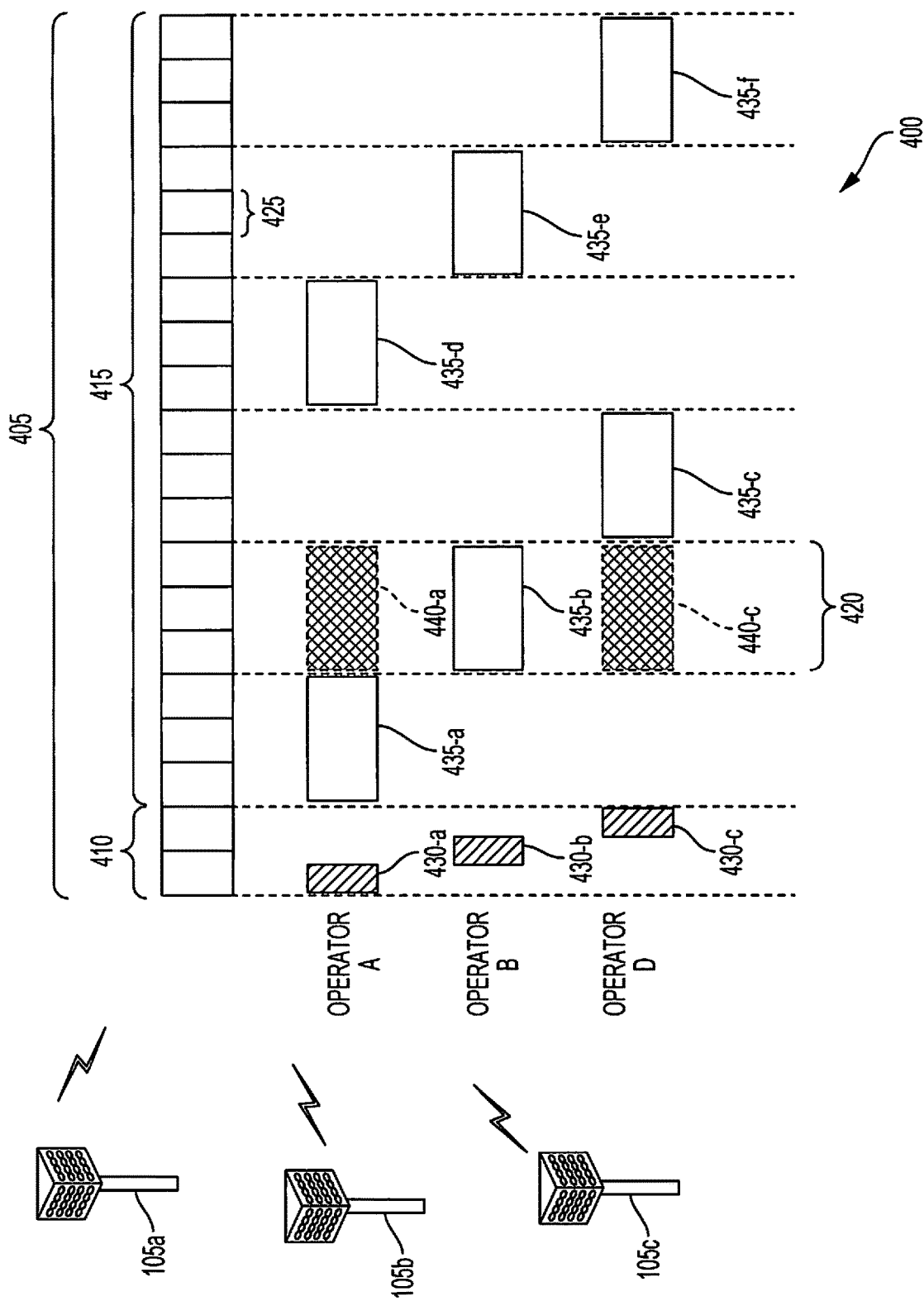
FIGS. 4A and 4B are block diagrams illustrating shared spectrum network.

FIG. 4A illustrates an example of a timing diagram 400 for coordinated resource partitioning. The timing diagram 400 includes a superframe 405, which may represent a fixed duration of time (e.g., 20 ms). Superframe 405 may be repeated for a given communication session and may be used by a wireless system such as 5G network 100 described with reference to FIG. 1. The superframe 405 may be divided into intervals such as an acquisition interval (A-INT) 410 and an arbitration interval 415. As described in more detail below, the A-INT 410 and arbitration interval 415 may be subdivided into sub-intervals, designated for certain resource types, and allocated to different network operating entities to facilitate coordinated communications between the different network operating entities. For example, the arbitration interval 415 may be divided into a plurality of sub-intervals 420. Also, the superframe 405 may be further divided into a plurality of subframes 425 with a fixed duration (e.g., 1 ms). While timing diagram 400 illustrates three different network operating entities (e.g., Operator A, Operator B, Operator C), the number of network operating entities using the superframe 405 for coordinated communications may be greater than or fewer than the number illustrated in timing diagram 400.

The A-INT 410 may be a dedicated interval of the superframe 405 that is reserved for exclusive communications by the network operating entities. In some examples, each network operating entity may be allocated certain resources within the A-INT 410 for exclusive communications. For example, resources 430-*a* may be reserved for exclusive communications by Operator A, such as through base station 105*a*, resources 430-*b* may be reserved for exclusive communications by Operator B, such as through base station 105*b*, and resources 430-*c* may be reserved for exclusive communications by Operator C, such as through base station 105*c*. Since the resources 430-*a* are reserved for exclusive communications by Operator A, neither Operator B nor Operator C can communicate during resources 430-*a*, even if Operator A chooses not to communicate during those resources. That is, access to exclusive resources is limited to the designated network operator. Similar restrictions apply to resources 430-*b* for Operator B and resources 430-*c* for Operator C. The wireless nodes of Operator A (e.g, UEs 115 or base stations 105) may communicate any information desired during their exclusive resources 430-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 410 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 435-*a* may be prioritized for use by Operator A and may therefore be referred to as a G-INT for Operator A (e.g., G-INT-OpA). Similarly, resources 435-*b* may be prioritized for Operator B, resources 435-*c* may be prioritized for Operator C, resources 335-*d* may be prioritized for Operator A, resources 435-*e* may be prioritized for Operator B, and resources 435-*f* may be prioritized for operator C.

The various G-INT resources illustrated in FIG. 4 appear to be staggered to illustrate their association with their respective network operating entities, but these resources may all be on the same frequency bandwidth. Thus, if viewed along a time-frequency grid, the G-INT resources may appear as a contiguous line within the superframe 405. This partitioning of data may be an example of time division multiplexing (TDM). Also, when resources appear in the same sub-interval (e.g., resources 440-*a* and resources 435-*b*), these resources represent the same time resources with respect to the superframe 405 (e.g., the resources occupy the same sub-interval 420), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 435-*a* without interference from the wireless nodes of Operator B or Operator C.

A network operating entity may additionally signal to another operator that it intends to use a particular G-INT. For example, referring to resources 435-*a*, Operator A may signal to Operator B and Operator C that it intends to use resources 435-*a*. Such signaling may be referred to as an activity indication. Moreover, since Operator A has priority over resources 435-*a*, Operator A may be considered as a higher priority operator than both Operator B and Operator C. However, as discussed above, Operator A does not have to send signaling to the other network operating entities to ensure interference-free transmission during resources 435-*a* because the resources 435-*a* are assigned with priority to Operator A.

Similarly, a network operating entity may signal to another network operating entity that it intends not to use a particular G-INT. This signaling may also be referred to as an activity indication. For example, referring to resources 435-*b*, Operator B may signal to Operator A and Operator C that it intends not to use the resources 435-*b* for communication, even though the resources are assigned with priority to Operator B. With reference to resources 435-*b*, Operator B may be considered a higher priority network operating entity than Operator A and Operator C. In such cases, Operators A and C may attempt to use resources of sub-interval 420 on an opportunistic basis. Thus, from the perspective of Operator A, the sub-interval 420 that contains resources 435-*b* may be considered an opportunistic interval (O-INT) for Operator A (e.g., O-INT-OpA). For illustrative purposes, resources 440-*a* may represent the O-INT for Operator A. Also, from the perspective of Operator C, the same sub-interval 420 may represent an O-INT for Operator C with corresponding resources 440-*b*. Resources 440-*a*, 435-*b*, and 440-*b* all represent the same time resources (e.g., a particular sub-interval 420), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 435-*b* (e.g., G-INT-OpB), then Operator A may use those same resources (e.g., represented by resources 440-*a*) by first checking the channel for interference (e.g., LBT) and then transmitting data if the channel was determined to be clear. Similarly, if Operator C wanted to access resources on an opportunistic basis during sub-interval 420 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than one operator is attempting access simultaneously.

In some examples, a network operating entity may intend not to use a particular G-INT assigned to it, but may not send out an activity indication that conveys the intent not to use the resources. In such cases, for a particular sub-interval 420, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 4A, each sub-interval 420 includes a G-INT for one of Operators A, B, or C. However, in some cases, one or more sub-intervals 420 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 425 may contain 14 symbols (e.g., 250-μs for 60 kHz tone spacing). These subframes 425 may be standalone, self-contained Interval-Cs (ITCs) or the subframes 425 may be a part of a long ITC. An ITC may be a self-contained transmission starting with a downlink transmission and ending with a uplink transmission. In some embodiments, an ITC may contain one or more subframes 425 operating contiguously upon medium occupation. In some cases, there may be a maximum of eight network operators in an A-INT 410 (e.g., with duration of 2 ms) assuming a 250-μs transmission opportunity.

Although three operators are illustrated in FIG. 4A, it should be understood that fewer or more network operating entities may be configured to operate in a coordinated manner as described above. In some cases, the location of the G-INT, O-INT, or A-INT within superframe 405 for each operator is determined autonomously based on the number of network operating entities active in a system. For example, if there is only one network operating entity, each sub-interval 420 may be occupied by a G-INT for that single network operating entity, or the sub-intervals 420 may alternate between G-INTs for that network operating entity and O-INTs to allow other network operating entities to enter. If there are two network operating entities, the sub-intervals 420 may alternate between G-INTs for the first network operating entity and G-INTs for the second network operating entity. If there are three network operating entities, the G-INT and O-INTs for each network operating entity may be designed as illustrated in FIG. 4. If there are four network operating entities, the first four sub-intervals 420 may include consecutive G-INTs for the four network operating entities and the remaining two sub-intervals 420 may contain O-INTs. Similarly, if there are five network operating entities, the first five sub-intervals 420 may contain consecutive G-INTs for the five network operating entities and the remaining sub-interval 420 may contain an O-INT. If there are six network operating entities, all six sub-intervals 420 may include consecutive G-INTs for each network operating entity. It should be understood that these examples are for illustrative purposes only and that other autonomously determined interval allocations may be used.

It should be understood that the coordination framework described with reference to FIG. 4A is for illustration purposes only. For example, the duration of superframe 405 may be more or less than 20 ms. Also, the number, duration, and location of sub-intervals 420 and subframes 425 may differ from the configuration illustrated. Also, the types of resource designations (e.g., exclusive, prioritized, unassigned) may differ or include more or less sub-designations.

Figure 4B:
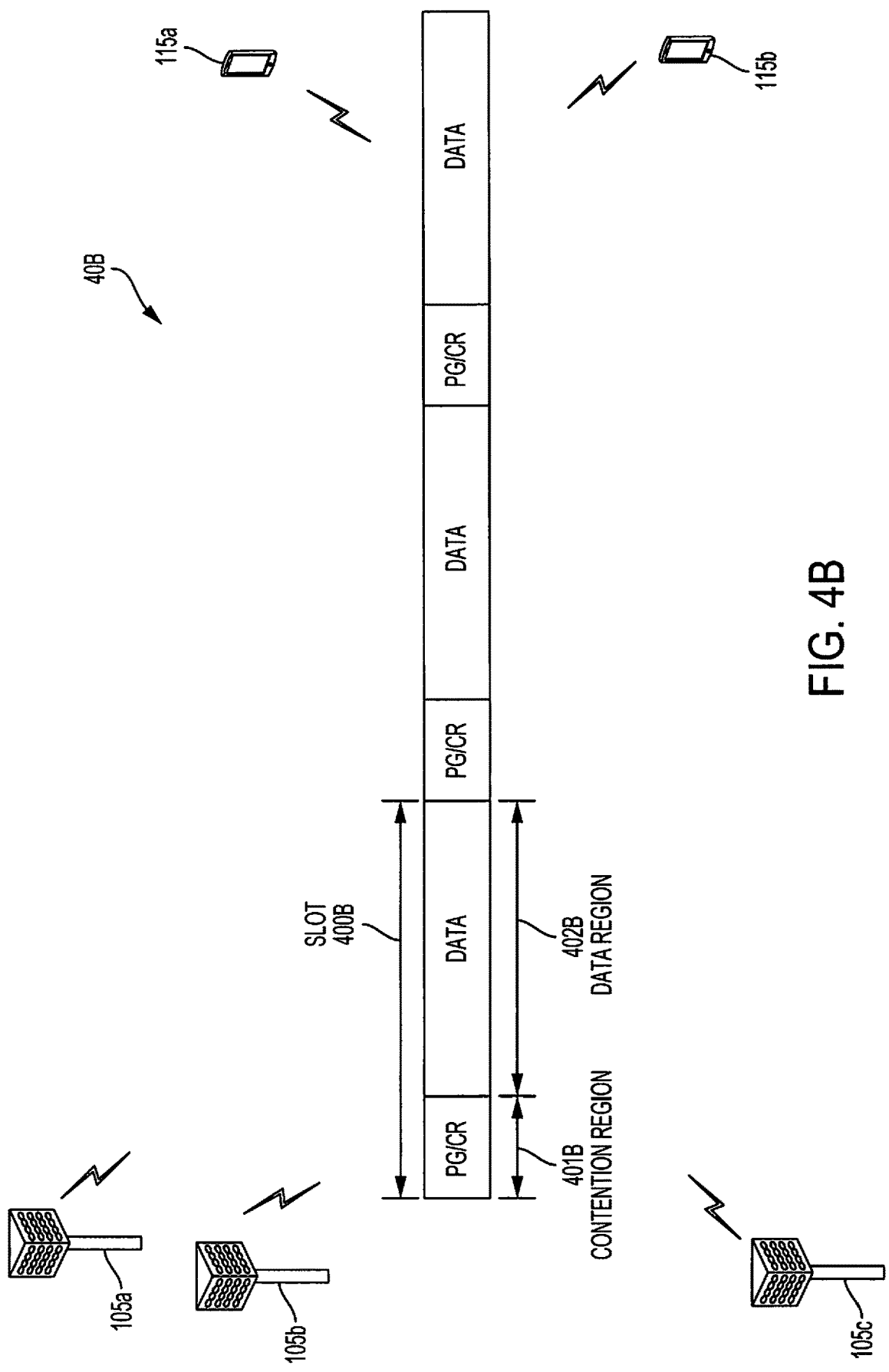

FIG. 4B is a block diagram illustrating shared spectrum network 40B. In a shared spectrum (unlicensed spectrum) use case, such as shared spectrum network 40B, it may be beneficial to have a contention mechanism to allow different links to share the spectrum. Sharing may occur between different operators and within the same operator but sharing between different links (including downlink/uplink). Shared spectrum network 40B includes base stations 105a-105c and UEs 115a and 115b. The various aspects described herein involve frame-based equipment (FBE), in which there is known timing across all nodes (e.g., base stations 105a-105c and UEs 115a and 115b) and the channel is divided in units of slots in the time domain, such as slot 400B. The active nodes may contend for the channel on a slot-by-slot manner. In each slot, such as slot 400B, there may be a contention region 401B at the beginning, to decide on which links will be active, followed by a data transmission portion 402B. For effective coexistence, it may be understood that two transmitters or two receivers will not interfere with each other, but a transmitter of one link may interfere with the receiver of another link.

In systems having operating frequencies under 6 GHz, an approach has been suggested for channel contention using contention messages sent during a contention slot. Such sub-6 GHz operations assume a single operator that supports dynamic time division duplex (TDD). The contention region may also be assumed to be at the beginning of a transmission slot. Within the contention region, a resource request (RRQ), which would be transmitted from an eNB or base station. The responding signal is the resource receiver signal (RRS), which is transmitted from the receiver (e.g., eNBs in uplink communications or UEs in downlink communications). Other potential transmitters may see this RSS and may back-off, assuming that the other potential transmitters will interfere with this RRS. The sub-6 GHz proposal may also further assume there is a known priority direction (downlink or uplink) in a given slot. The RRQ may be transmitted from the eNB, and the RRS from the receiver of the default direction. A clear-to-send RRS (CRS) may be transmitted from the transmitter of the alternative direction (the non-priority direction). One interesting issue involves the RRS from the receiver, in which either the UE or eNB may be transmitting at the same time. One potential problem with this operation is that there may be no announcement from potential transmitters. Therefore, when the receiver announces an RRS, it may not explicitly knowing if there is an actual interferer.

For the various aspects of the present disclosure, there are three signaling components: (1) Pre-grant (PG) signaling, which may carry identification of the entity to be scheduled along with an uplink or downlink grant, as dictated by the scheduled entity (PG signaling may include both data PG and contention PG signals); (2) channel resolution—transmitter (CR-T) signaling, which announces the intent of the transmitter to transmit the data to a target UE, includes communication of the transmit power information; and (3) channel resolution—receiver (CR-R) signaling, which announces the intent to receive data from a target transmitter, and includes the acceptable interference level and the current CR-R transmit power information. The receiver nodes receiving such CR-T may determine how much interference will be experienced based on the transmitting nodes' transmissions. The transmitter nodes receiving the CR-R may determine how much interference will be generated when transmitting data and if this level of interference is acceptable to the receiver node.

Figure 5A:
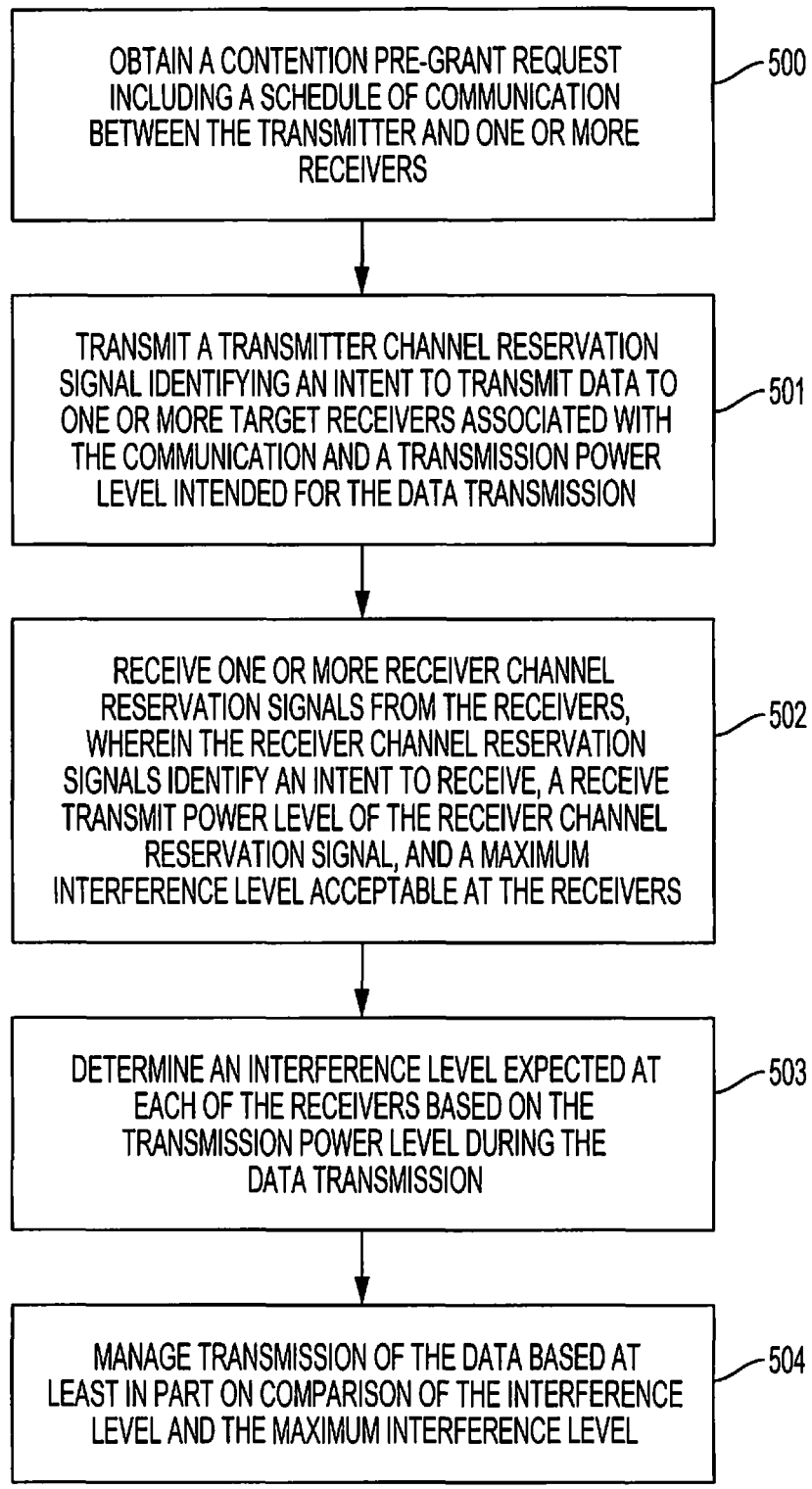
FIGS. 5A and 5B are block diagrams illustrating example blocks executed to implement aspects of the present disclosure.

FIG. 5A is a block diagram illustrating example blocks executed to implement one aspect of the present disclosure. At block 500, a contention pre-grant request is obtained at a transmitter including a schedule of communication between the transmitter and one or more receivers. The transmitter may be either a base station/eNB or UE depending on the link direction of the communication. Thus, if there is uplink communication, then the UE would be considered the transmitter, while for downlink communications, the base station/eNB would be considered the transmitter.

At block 501, the transmitter transmits a transmitter channel reservation signal identifying an intent to transmit data to one or more target receivers associated with the communication and a transmission power level intended for the data transmission. The transmitter entity transmits CR-T which includes the intent to transmit the data to the target receivers, and the transmit power level that the data will be transmitted at.

At block 502, the transmitter receives one or more receiver channel reservation signals from the receivers, wherein the receiver channel reservation signals identify an intent to receive, a receive transmit power level of the receiver channel reservation signal, and a maximum interference level acceptable at the receivers. Similar to the content of CR-T, the transmitter will monitor for and detect any transmissions of CR-R from receivers in the neighboring locations, including the target receiver.

At block 503, the transmitter determines an interference level expected at each of the receivers based on the transmission power level during the data transmission. The transmitter will calculate the expected interference that will be experienced at each of the receivers that it has received CR-R from.

At block 504, the transmitter manages transmission of the data based at least in part on comparison of the interference level and the maximum interference level. Using the determined expected interference level and the maximum interference level, the transmitter will determine whether any interference that will be generated by the transmitter as seen at the associated receiver may either meet or exceed the maximum interference level capable at the receiver. If the expected interference exceeds the maximum interference level, the transmitter may manage transmission by backing off of the transmission, either by transmitting with reduced power level or by declining the transmission grant. If the expected interference does not exceed the maximum interference level, the transmitter may transmit the data to the target receiver using the reported transmit power level.

Figure 5B:
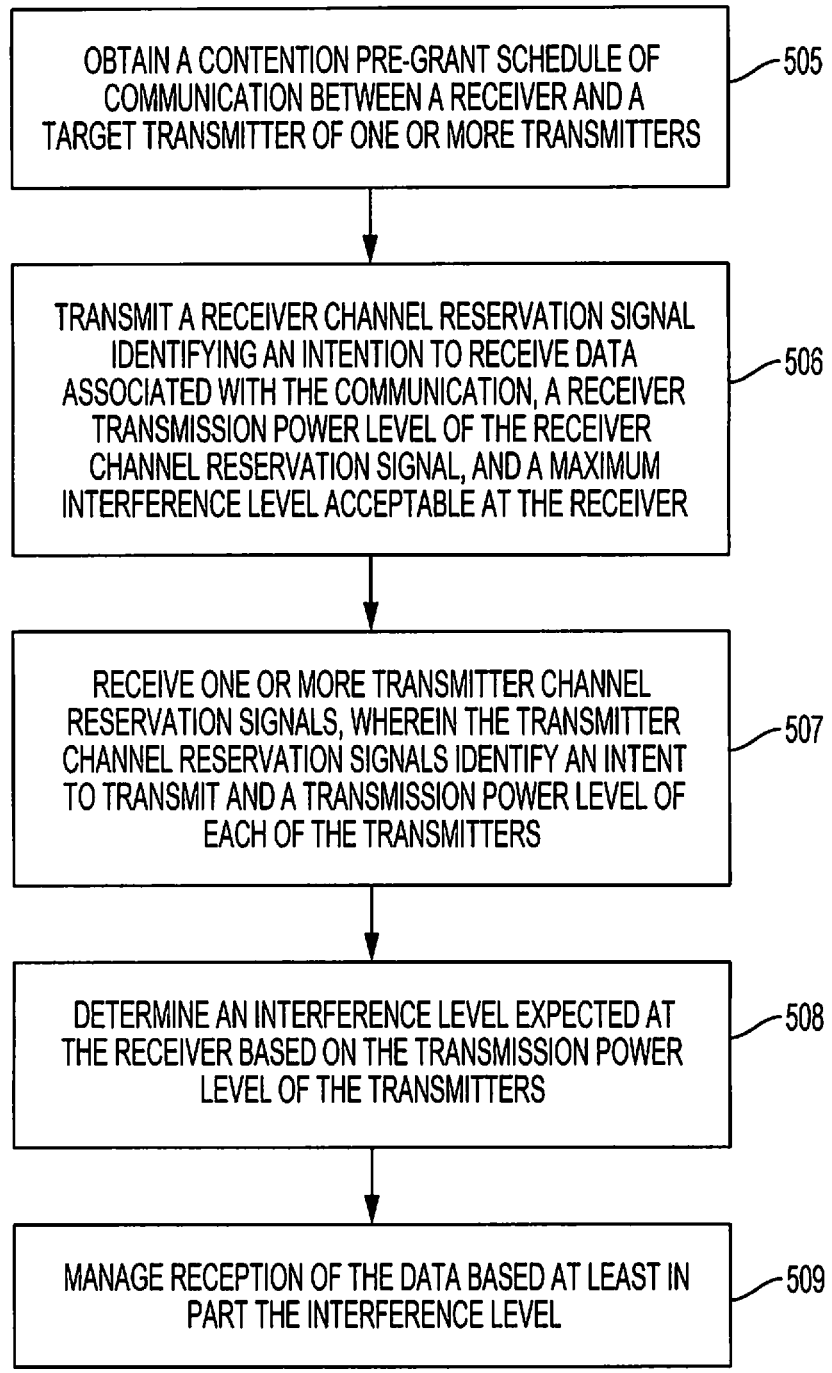

FIG. 5B is a block diagram illustrating example blocks executed to implement one aspect of the present disclosure. The blocks of FIG. 5B illustrate the contention procedure from a receiver perspective. At block 505, the receiver obtains a contention pre-grant schedule of communication between the receiver and a target transmitter among multiple transmitters. A scheduling base station transmits the contention PG that includes the grant for the transmitter. In uplink communications, the base station transmits an uplink grant to a UE as the transmitter of uplink data, while in downlink communications, the base station transmits a downlink grant, in which the base station will be transmitting data to the target UE/receiver.

At block 506, the receiver transmits a receiver channel reservation signal identifying an intention to receive data associated with the communication, a receiver transmission power level of the receiver channel reservation signal, and a maximum interference level acceptable at the receiver. The CR-R transmission from the receiver includes notification of the intent to receive data from the target transmitter, the power level of the CR-R, and the maximum interference level that the receiver is capable of handling.

At block 507, the receiver receives one or more transmitter channel reservation signals, wherein the transmitter channel reservation signals identify an intent to transmit and a transmission power level of each of the transmitters. The receiver monitors for all CR-T transmissions in order to obtain the transmission power levels expected.

At block 508, the receiver determines an interference level expected at the receiver based on the transmission power level of the transmitters. Using the transmission power levels from the CR-T, the receiver calculates the expected interference that it may see if the transmitter associated with the received CR-T would, in fact, transmit data.

At block 509, the receiver manages reception of the data based at least in part on the interference level. With the expected interference calculated, the receiver will determine either to continue to receive the data from the target transmitter or determine to back-off the reception because the expected interference level is too high. The receiver can back-off by changing the MCS of the data being transmitted from the target transmitter or may decline the transmission grant completely.

It should be noted that in various aspects, CR transmissions may optionally contain node identity. Moreover, CR signals may use a longer cyclic prefix (CP) than normal OFDM symbols in order to handle transmissions from distant nodes.

Optionally, CR signals may also include a priority level for priority based back-off control. Typically, an eNB or base station may decide the priority and would include identification of the priority in the PG transmission. Subsequent CR signaling (CR-R/CR-T) may repeat this priority identification by including the priority. Priority in the various aspects may be based on multiple different criteria, such as, for example, quality of service (QoS) control (e.g., higher QoS traffic uses higher priority value), operator-based priority (e.g., higher priority operators may use higher priority values), link direction priority (e.g., uplink vs downlink direction), and the like. It should be noted that priority may change from slot-to-slot.

The various aspects of the present disclosure provide for all transmitters to monitor CR-R from receivers, and all receivers to monitor CR-T from transmitters. It should be noted that the CR-T from a given transmitter has no use for other transmitters and CR-R from a given receiver has no use for other receivers. The various aspects define a PG burst and alternating CR-R and CR-T bursts. In operation, the transmitters collect all CR-R transmissions in the CR-R burst, and the receivers collect all CR-T transmissions in the CR-T burst, in which the transmitters transmit and receivers receive. The transmitters will listen to CR-Rs from receivers to see if the transmitters scheduled transmissions will create too much interference at the receivers. If a CR-R is discovered, the receiver sending the CR-R can be interfered with by this transmitter. If the generated interference level by the identified transmitter exceeds what the receiver can handle, the transmitter may back-off. Backing off at the transmitter may include both reducing transmit power or declining the transmission grant altogether.

Similarly, receivers will listen to CR-Ts from transmitters to see if there are stronger interferers that reduce the SINR of the transmission. If a CR-T is discovered, the transmitter sending the CR-T can create interference at this receiver. If the interference level is too high, the receiver can then back-off. Backing off at a receiver includes reducing MCS of the data transmitted to the receiver or declining the reception grant altogether. In operations of the various aspects of the present disclosure, there may be multiple rounds of CR-T and CR-R to allow the nodes to negotiate the most efficient communication environment. Moreover, different approaches to establishing contention may be employed depending on whether the first CR signal after a PG is either CR-R or CR-T.

Figure 6:
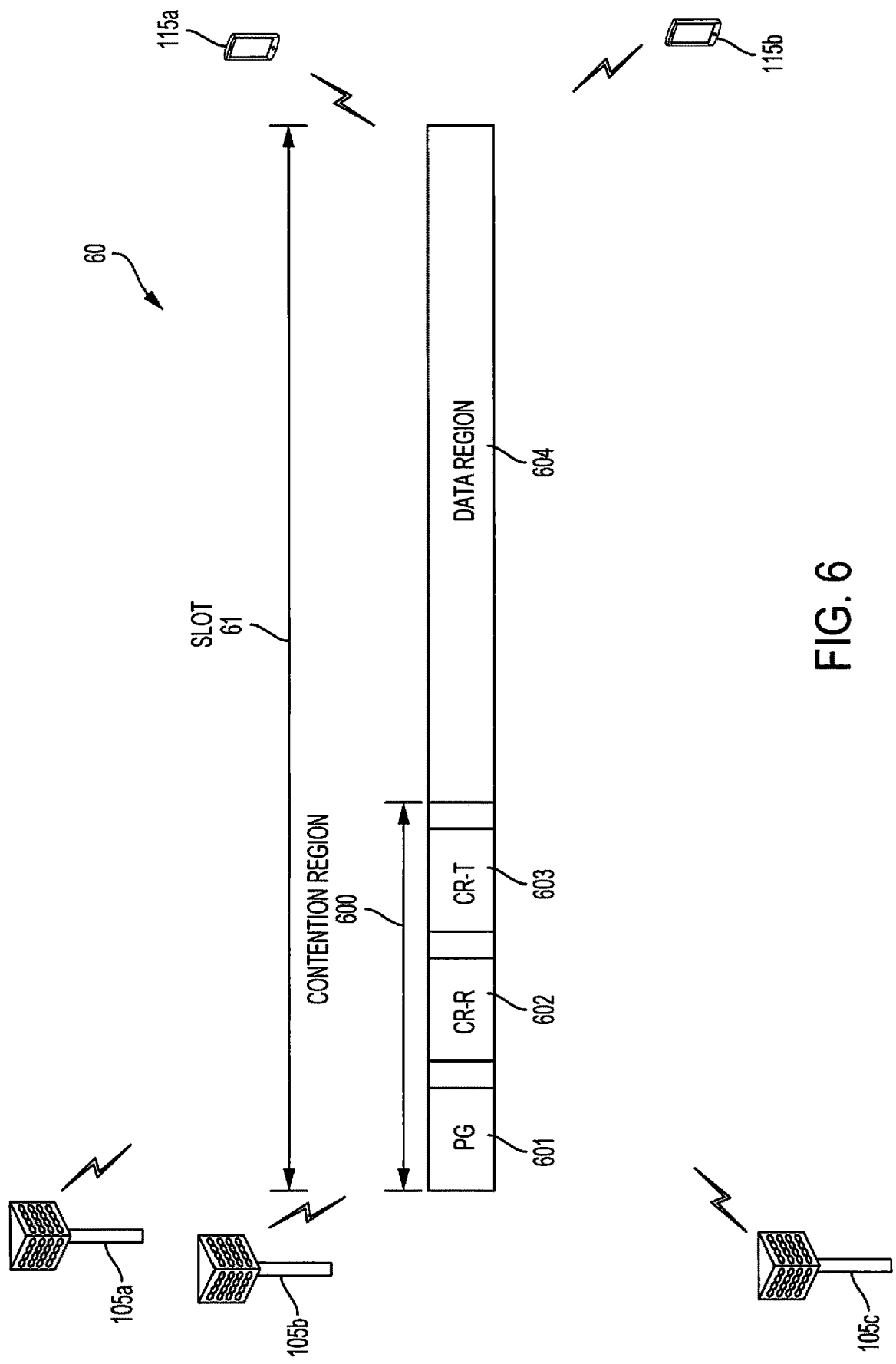
FIG. 6 is a block diagram illustrating a contention network configured according to one aspect of the present disclosure.

FIG. 6 is a block diagram illustrating contention network 60 configured according to one aspect of the present disclosure. Contention network 60 includes base stations 105a-105c and UEs 115a and 115b. The communication is divided into slots, such as slot 61. Slot 61 includes contention region 600, which contains the contention resolution messages contention PG 601, CR-R 602, and CR-T 603. Slot 61 also includes data region 604, which would include the data bursts from a target transmitter to a target receiver. For example, in uplink communications, the data burst may be between UE 115b, as the target transmitter, and eNB 105a, as the target receiver, while in downlink communications, the data burst may between eNB 105c, as the target transmitter, and UE 115c, as the target receiver. In one example aspect of the present disclosure, after transmission of contention PG 601, the first transmission may be CR-R 602. In such an occurrence, there is no reason for the receiver to decline yet, therefore, CR-R 602 transmission will directly follow contention PG 601. CR-R 602 interference level announcement will generally capture thermal noise/background interference. This is an optimistic interference level announcement, as it does not capture the interference from all transmitters.

The additional aspect of multi-burst operation according to the present disclosure provides for CR-R 602 to be transmitted first after contention PG 601. Contention PG signaling 601 in the CR-R-first aspect transmits pre-grant requests and schedules downlink or uplink communications in contention region 600 of slot 61. CR-R signal 602 still announces the intent to receive the data from the target transmitter, the power level of the transmitted CR-R, and the interference level that can be handled at the receiver. In a downlink communication scenario, the UE, such as UEs 115a-115b, can decline communication when there is knowledge that the interference is too strong or if the UE has been silenced based on a previous round of contention. Otherwise, the UE would signal the information as described. In an uplink communication scenario, the eNB, such as base stations 105a-105c, would not typically have any reason to decline receiving, as this CR-R 602 transmitted by the eNB would follow contention PG 601, which is also transmitted by the eNB. The potential transmitters would monitor for and detect such CR-Rs 602. If the interference level that would be generated by the transmitter is too high and cannot be handled by the CR-R transmitting receiver, the potential transmitter can decline transmission. For example the communication grants (uplink or downlink) may be declined or canceled by the respective node.

After transmission of CR-R 602, the transmitters remaining (e.g., the transmitters that determine the expected interference generated will not exceed the receiver's maximum allowable interference) would transmit CR-T announcements 603. In the appropriate entity would transmit the intent to transmit the data to the target receiver and the intended transmit power level (e.g., UE, such as UE 115a-115b, for uplink communication, eNB/base station, such as base stations 105a-105c, for downlink communication). The remaining receivers (e.g., the receivers that do not determine to back-off of reception) will monitor for CR-T signals 603 and, when detected, determine which transmitters will be potential interferers and data SINR that may be triggered. If the SINR exceeds a threshold, the receiver can decline the reception.

For admission control with an acceptable interference level announced in CR-R signal 602 in the beginning of slot 61, there may be many links to be served, such as those with traffic. After each CR-R 602 or CR-T step 603, some links may naturally terminate or be declined. At the end of the contention region, the result may be a set of links that can coexist well. Especially when multiple CR-R/CR-T rounds are conducted, the way to achieve the effect is to control the identified acceptable interference levels in the CR-R transmissions. For example, at the beginning of slot 61, receivers may transmit CR-R 602 indicating a relatively large acceptable interference level. With the larger acceptable interference level, more transmitters may originally be allowed. Thereafter, the receivers may gradually decrease the acceptable interference level reported in subsequent rounds of CR-R transmission. The reduced acceptable interference level may cause more and more transmitter links to be ruled out until a stable point can be reached.

It should be noted that, there may be a practical limit on the level of contention overhead that may be provided for that preserves efficiency in the operations. Thus, the various aspects of the present disclosure would not provide for too many CR-R/CR-T rounds of negotiation.

With the concept of a priority added to the contention process with contention PG 601, CR-R 602, and CR-T 603, the back-off decision rules can be modified so that lower priority links back-off for higher priority links. On the transmitter side, when heavy interference may be generated at the receiver sending the discovered CR-R 602, but CR-R 603 contains lower priority than the transmitter itself, then the transmitter may not want to back-off. For example, if the transmitter was base station 105b and the receiver was UE 115b, if the downlink direction has priority, even if the expected interference to UE 115b was determined to exceed the maximum interference level at UE 115b, base station 105b would be less inclined to back-off transmission because it has the higher priority. On the receiver side, if heavy interference is discovered from a transmitter sending the discovered CR-T, but the CR-T contains lower priority than the transmitter itself, then the receiver may not want to back-off. Instead, the higher priority receiver would still send CR-R 602 and let the transmitter know there is a high priority receiver nearby and that the transmitter should back-off.

Figure 7:
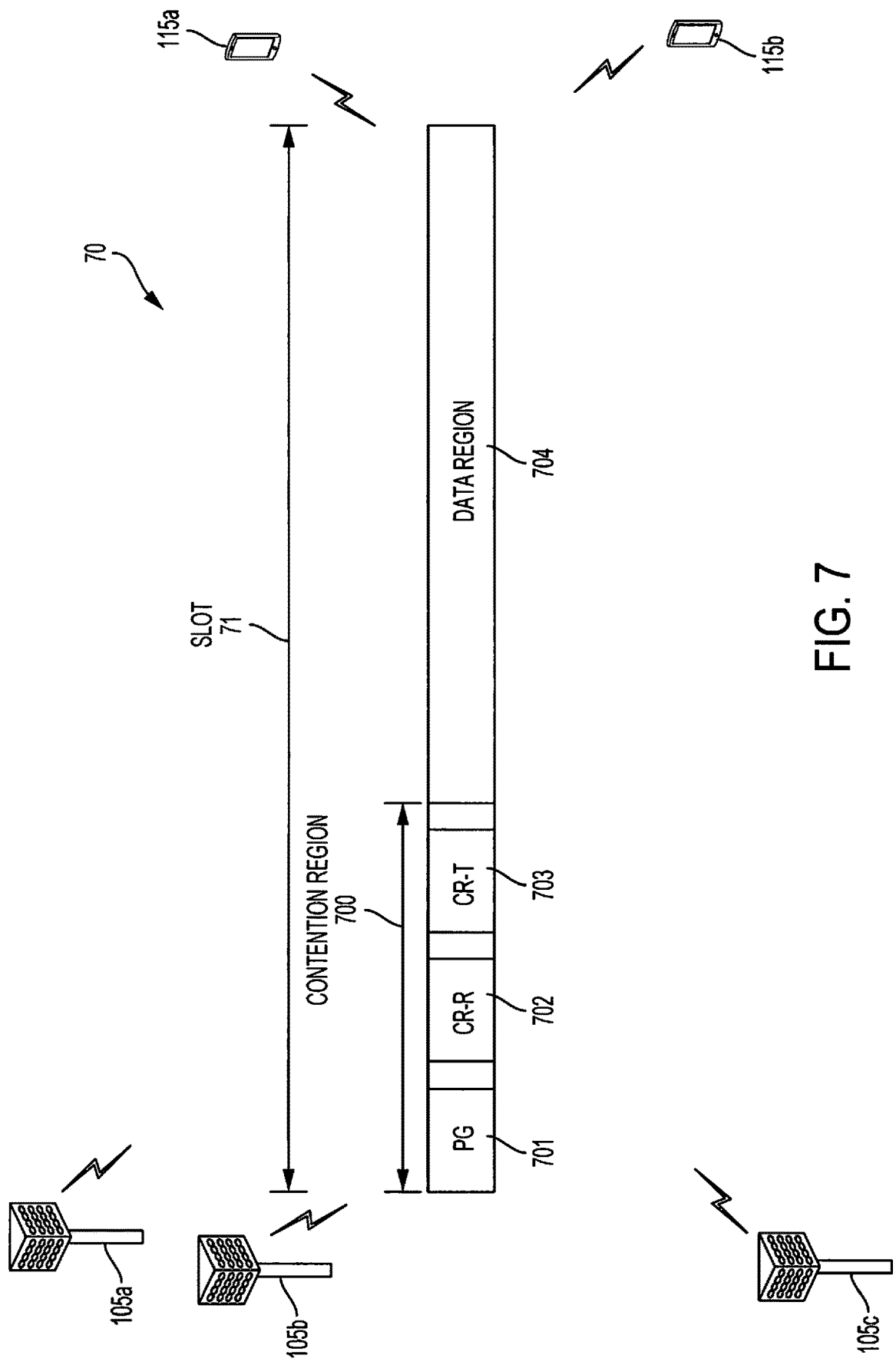
FIG. 7 is a block diagram illustrating a contention network configured according to one aspect of the present disclosure.

FIG. 7 is a block diagram illustrating contention network 70 configured according to one aspect of the present disclosure. In another example aspect of the present disclosure, after contention PG 701, the first transmission may be CR-T 702 in contention region 700 of slot 71. As with the previous aspect, there is also no reason to decline transmissions at this point after contention PG 701, and CR-T transmission 702 will directly follow contention PG 701. The measurement from these CR-T 702 may be considered pessimistic, as some of the transmitters transmitting CR-T signals 702 may not eventually transmit.

In a multi-burst operation, in which CR-T 702 is transmitted after contention PG 701, with CR-R 703 transmitted after CR-T 702, contention PG 701 is transmitted from an eNB, such as any of base stations 105a-105c, for downlink or uplink communication requests. The CR-T process operates according to multiple steps. On the transmitter side, the potential transmitter transmits in CR-T 702 an announcement of the intent to transmit data to a target receiver and the transmit power level that will be used to transmit data to the target receiver. When the communication is uplink communication, a UE, such as either of UEs 115a-115b, transmits CR-T 702. The UE may, in fact, decline based on contention PG 701 and not actually transmit CR-T 702. For example, the UE may somehow not transmit because it may have been silenced by earlier LBT procedures. When the communication is downlink communication, an eNB, such as base stations 105a-105c, transmits CR-T 702. Because this eNB transmission of CR-T 702 would directly follow the eNB transmission of contention PG 701, there would be no reason for the base station to back-off. All potential receivers (e.g., eNBs 105a-105c for uplink communications and UEs 115a-115b for downlink communications) monitor this region. Contention PG 701 would trigger a UE scheduled for downlink communications to detect CR-Ts 702 from all surrounding transmitters, including the target transmitter that will be sending actual data in data region 704 to the UE. The receivers will determine which of the detected transmitters will be an interferer, and can predict the data SINR. If the data SINR is bad because of the level of interference caused by one or more of the transmitters, the receiver can decline the transmission (e.g., by declining the uplink grant, or reducing the MCS, or the like).

After CR-T transmission 702 in the CR-T-first aspect, the receivers that do not decline the scheduled communication will transmit CR-R announcements 703. CR-R signals 703 announce the intent of the receiver to receive the data from the target transmitter, identify the transmission power level of CR-R 703, and signal the maximum interference level that can be handled by the receiver. On the transmitter side, each potential transmitter will detect CR-R signals 703 and, using the maximum interference level communicated, determine if the interference level that would be generated at that receiver by scheduled transmission by the transmitter at the announced transmitter power level would exceed the maximum interference level announced. If the interference level to be generated is too high and cannot be handled by the CR-R transmitter, the potential transmitter can decline transmission. For example, in downlink communications, the base station or eNB may cancel the downlink grant, or, for uplink communications, the UE may decline the later uplink grant. If there is another pre-grant process, either side can decline to be consistent with the determination.

Figure 8:
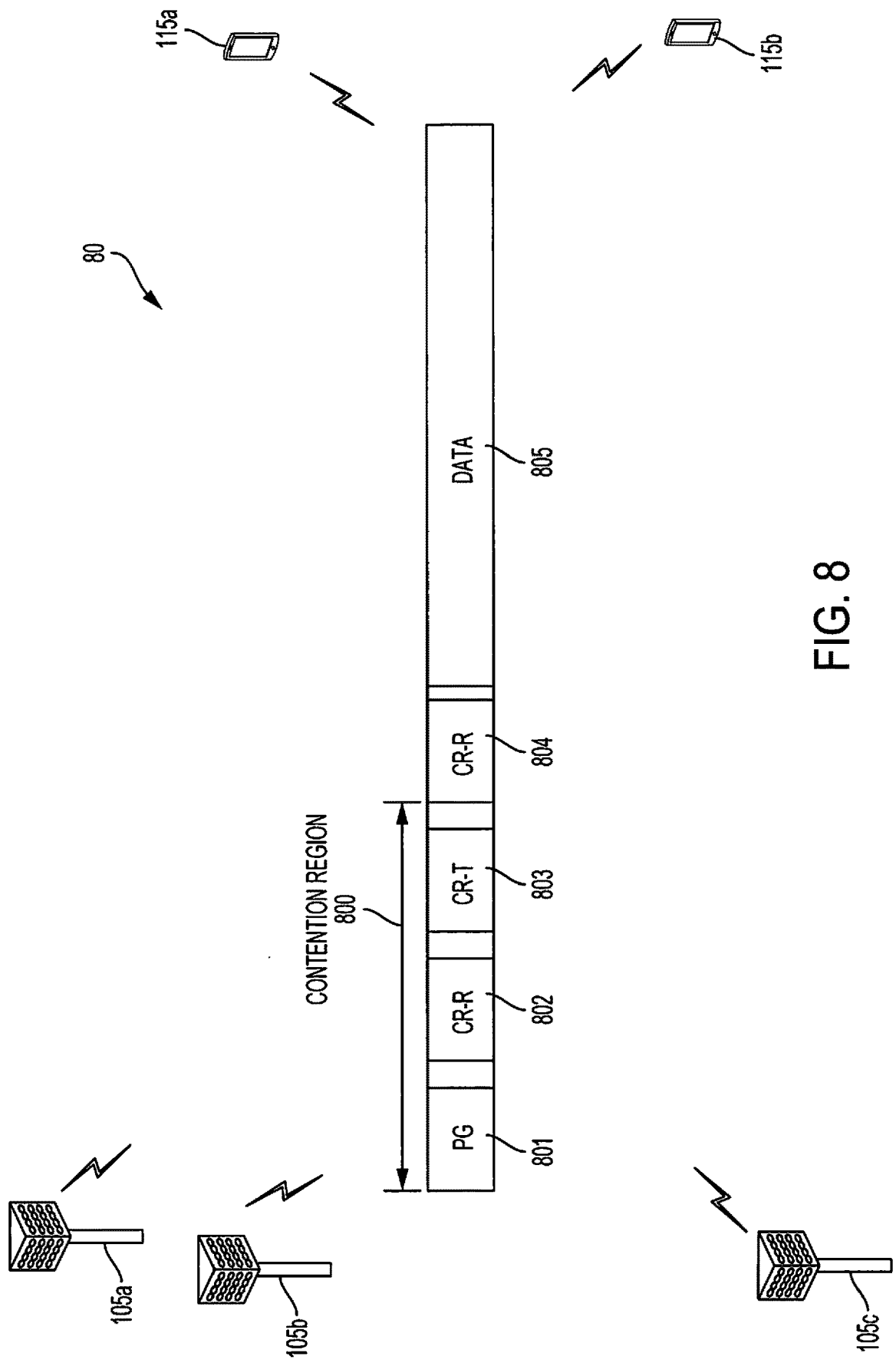
FIG. 8 is a block diagram illustrating a contention network configured according to one aspect of the present disclosure.

FIG. 8 is a block diagram illustrating contention network 80 configured according to one aspect of the present disclosure. In the illustrated aspect, the multi-burst contention resolution operation provides for multiple rounds of CR transmissions during a contention negotiation. Contention negotiation occurs within contention region 800 of the illustrated slot. Depending on the direction of communication (uplink vs downlink), base stations 105a-105c or UEs 115a-115b may be the transmitter or receiver within contention network 80. In an uplink communication scenario, UEs 115a-115b may be the transmitter which will transmit data 805 to the target receiver of one of base stations 105a-105c. Similarly, in a downlink communication scenario, base stations 105a-105c may be the transmitter which transmits data 1005 to the target receiver of one of UEs 115a-115b.

In a CR-R first aspect, as illustrated in FIG. 8, the first CR-R, CR-R 802, will capture thermal interference and announced an acceptable interference level that initially indicates a higher acceptable interference. In embodiments, CR-R may be located after PG 801. When the maximum acceptable interference level is set higher, more potential transmitters determine to decline or drop transmission. With a higher level, some transmitters may back-off of transmission and not send CR-T, but there will still be a number of transmitters sending CR-T transmissions 803. The next CR-R, CR-R 804, transmitted by the receivers would announce a lower acceptable interference level, which would trigger other transmitters to back-off and refrain from sending CR-T transmissions. The next round of CR-T transmission (not shown) may further drop links given the lower acceptable interference level from CR-Rs. With more dropped links, the acceptable interference level in receivers will actually increase. As the aspect continues with any further CR-R/CR-T rounds, receivers can use lower and lower acceptable interference levels to further drop links, which effectively reduces the total interference level in later rounds.

It should be noted that there may be an optimum number of rounds for such multi-round contention. Once beyond that number of rounds, the level of contention overhead increases above an acceptable level with little gained benefit in reduced interference.

Figure 9:
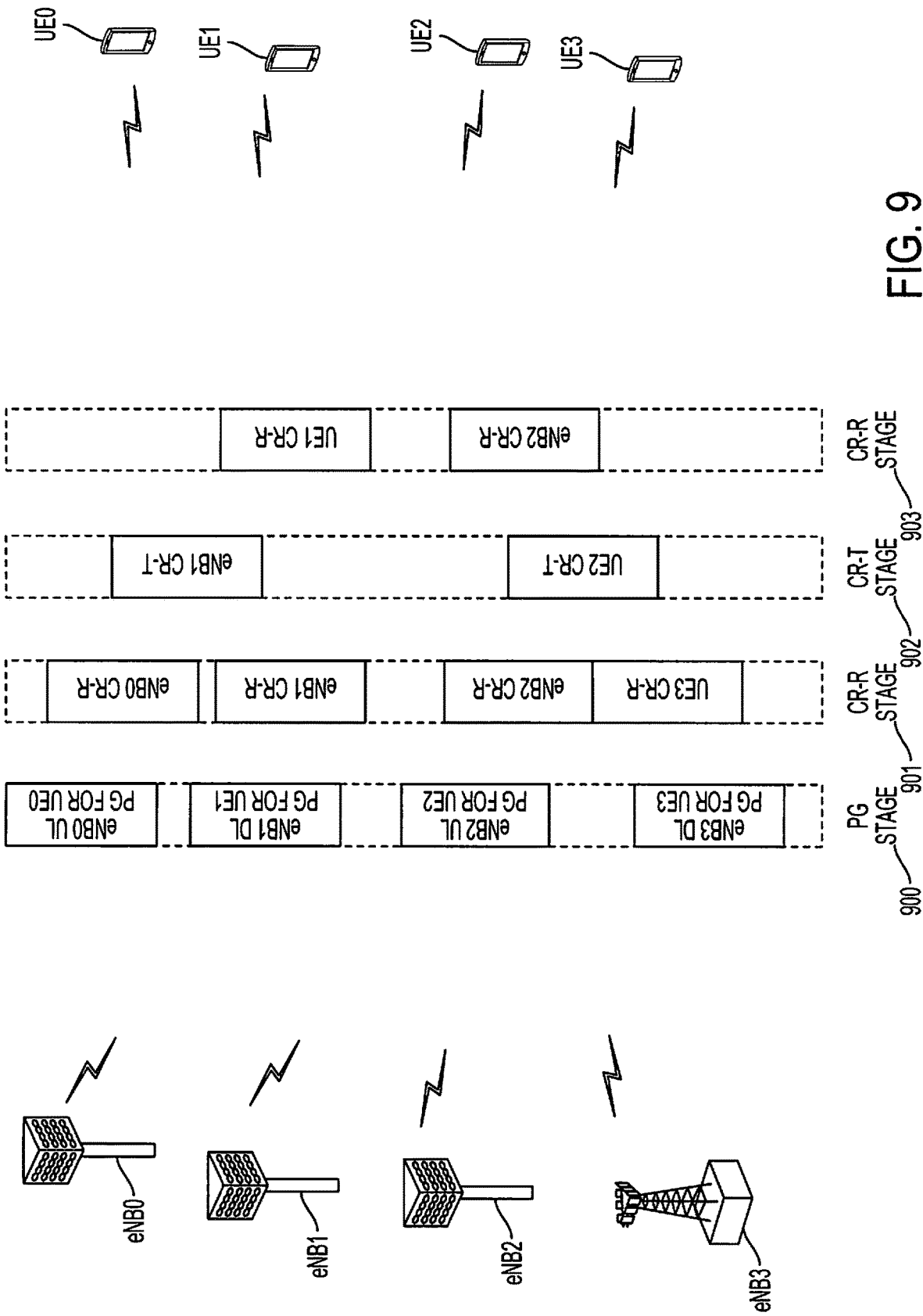
FIG. 9 is a block diagram illustrating contention-based communications between eNBs and UEs configured according to one aspect of the present disclosure.

FIG. 9 is a block diagram illustrating contention-based communications between eNBs 0-3 and UEs 0-3 configured according to one aspect of the present disclosure. In contention PG stage 900, eNBs 0-3 transmit contention PGs to UEs 0-3, respectively. In the first CR-R stage 901, all four CR-Rs are transmitted from the four receivers, UE1, UE3, eNB0, and eNB2, follow the respective contention PGs. In CR-T stage 902, UE0 and eNB3 notice from CR-R reception that their transmission will create too much interference, so they will decline by not sending CR-T signals. Only eNB1 and UE2 transmit CR-T signals in CR-T stage 902. In second CR-R stage 903, UE1 and eNB2 consider the interference from eNB1 and UE2 acceptable, respectively, and respond with CR-R transmissions.

As noted above, in additional aspects, the maximum interference level transmitted by the receivers at first CR-R stage 901 may be higher than the maximum interference level transmitted by eNB2 and UE1 at second CR-R stage 903.

Figure 10:
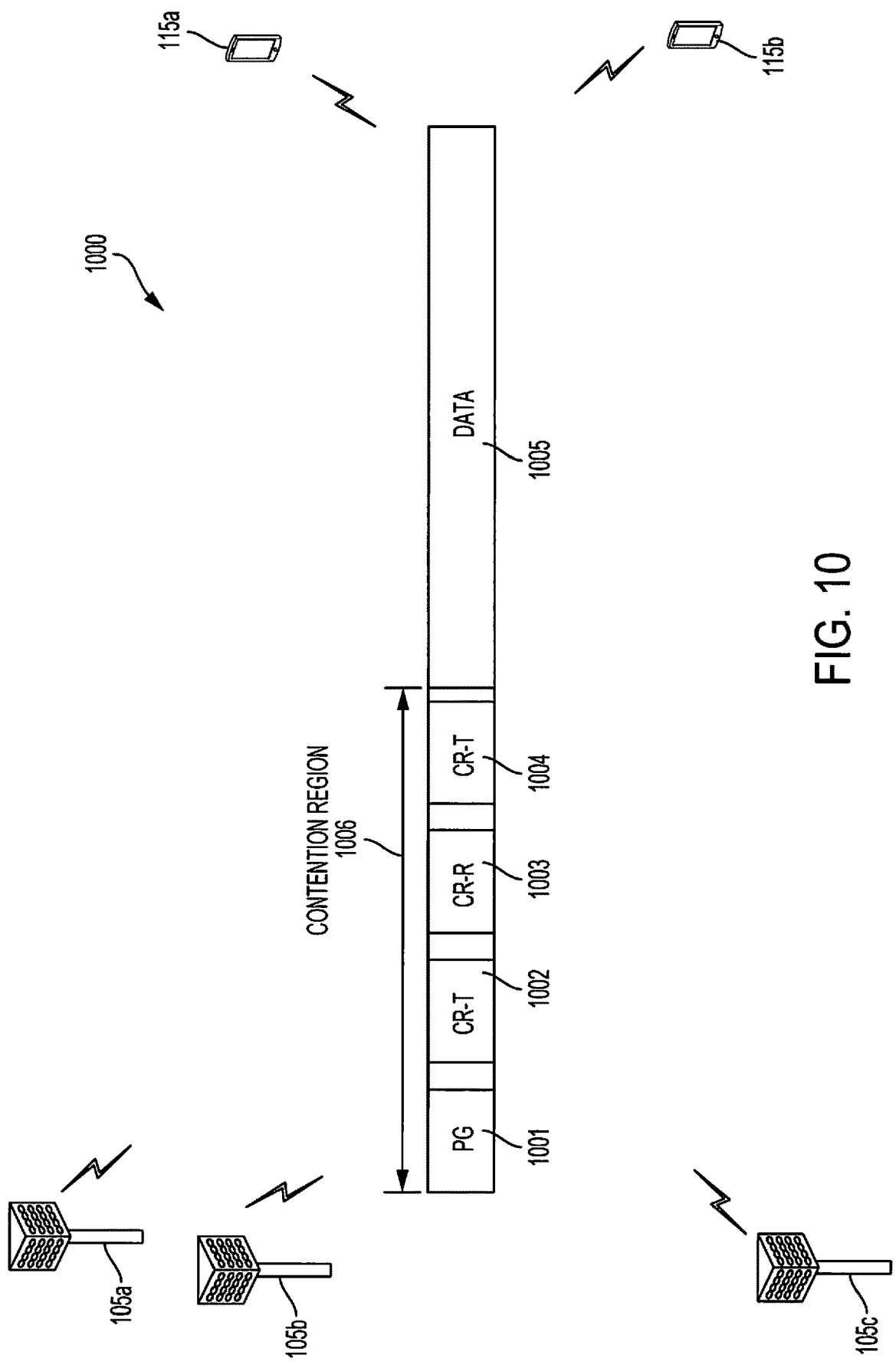
FIG. 10 is a block diagram illustrating a contention network configured according to one aspect of the present disclosure.

FIG. 10 is a block diagram illustrating contention network 1000 configured according to one aspect of the present disclosure. In the illustrated aspect, the multi-burst contention resolution operation also provides for multiple rounds of CR transmissions during a contention negotiation. Contention negotiation occurs within contention region 1006 of the illustrated slot. Depending on the direction of communication, base stations 105a-105c or UEs 115a-115b may be the transmitter or receiver within contention network 1000. For example, in an uplink communication scenario, UEs 115a-115b may be the transmitter which will transmit data 1005 to the target receiver of one of base stations 105a-105c. Similarly, in a downlink communication scenario, base stations 105a-105c may be the transmitter which transmits data 1005 to the target receiver of one of UEs 115a-115b.

In a different alternative aspect, first CR-T 1002 may be transmitted first after contention PG 1001. Because first CR-T 1002 will follow contention PG 1001, potential transmitters are less likely to immediately drop or back-off of transmission. If the transmission links are dropped later, then this first CR-T transmission 1002 would be considered a pessimistic transmission. The receivers transmission of CR-R 1003 after first CR-T 1002 are able to determine what the expected interference would be from the CR-T transmitters. This CR-R 1003 may also be considered pessimistic as it may capture more interference than actually will occur, as all of the potential transmitters will likely not transmit. Based on the acceptable interference level communicated through the given CR-R 1003 may prompt some transmitters to back-off and drop transmissions. Thus, next CR-T 1004 signals may be transmitted from fewer transmitters.

Additional aspects of the present disclosure may be directed to channel reservation signaling for multi-slot contention. In previously discussed aspects, all nodes contend in each slot separately. The additional aspect for multi-slot contention provides for contention to win more than one slot at a time. For example, one link may win in slot 0 and last through slot 3, while a different slot wins in slot 1 and lasts through slot 4.

For each slot, there is a contention region (with PG, CR-R, and CR-T), and a data region. The present example aspect may include single or multiple rounds of CRs, in which the competing nodes contend for access within the contention region of the slot. In operation of the present aspect, each contention signal (e.g, PG, CR-R, CR-T) may contain a length field to indicate how many slots the transmission/reception will secure by winning contention of the link or channel. When the link wins the contention, the data transmission of the link will be available over the given number of slots.

Figure 11:
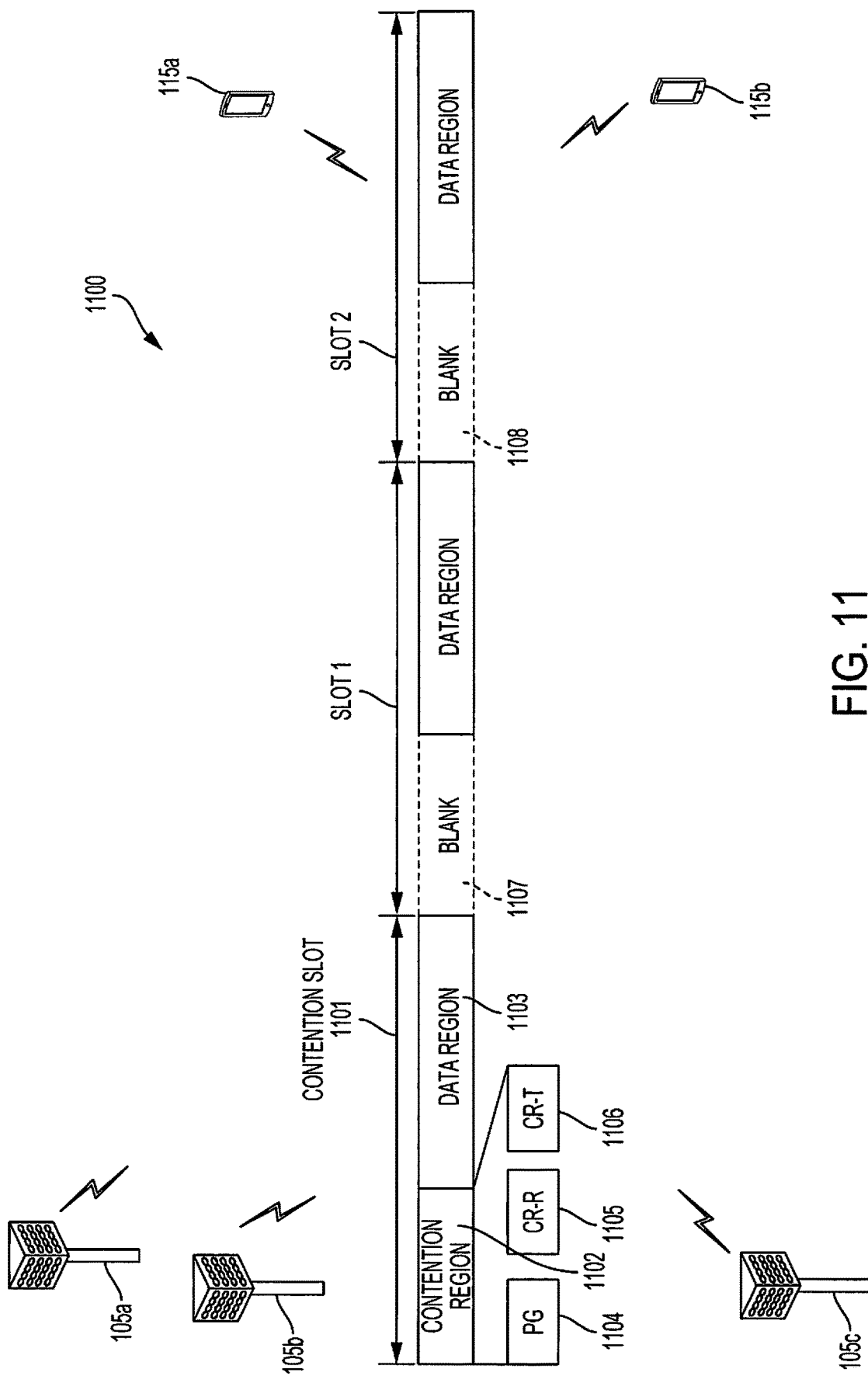
FIG. 11 is a block diagram illustrating a contention network configured according to one aspect of the present disclosure.

FIG. 11 is a block diagram illustrating a contention network 1100 configured according to one aspect of the present disclosure. Contention network 1100 operates to award multiple slots of transmission to the node that wins contention during the contention region of a slot, such as contention region 1102 of contention slot 1101. In embodiments, contention slot 101 may include contention region 1102 and data region 1103. One of base stations 105a-105c transmits contention PG 1104 in contention region 1102 of contention slot 1101. To avoid interfering in the contention requests of other links, in a first alternative aspect for multi-slot contention, the CRs, such as CR-R 1105 and CR-T 1106, may be transmitted only in contention slot 1101, while the winning transmitter blanks its CR transmissions in each of contention regions 1107 and 1108 of the remaining slots, slots 1 and 2. By blanking CR transmission from the winning transmitters in the later slots, contention overhead is greatly reduced, which reduces CR collision potential and results in a reduced need of CR capacity. The present aspect may also result in missing various CRs from transmitters/receivers because CRs are transmitted less frequently. In general, when transmitting CRs, the transmitting entity may not be able to detect the CRs from other nodes. Thus, the CR information collected by any given node may not be complete.

For a node being scheduled in contention PG 1104, the scheduled receiver node will transmit CR-R 1105, while the scheduled transmitter node will transmit CR-T 1106. The corresponding alternative nodes will then detect the alternative CR signal (e.g., the receiver will detect CR-T 1106, while the transmitter detects CR-R 1105). For a node not being scheduled in contention PG 1104, the unscheduled node will monitor both CR-R 1105 and CR-T 1106 segments. All CR monitoring results will be recorded at the nodes, such that when a node is granted for reception, it will use the information within all of the saved CR-Ts (current slot and previous slots) to determine the potential interfering entities, and when a node is granted for transmission, it will use the information within all of the saved CR-Rs (current slot and previous slots) to determine the potential victim entities.

According to the described example aspect, the CR transmissions (CR-R 1105 and CR-T 1106) within contention slot 1101 will remain effective until the end of the length of secured slots (e.g., slots 1 and 2). However, if a CR is canceled (e.g., CR-R 1105 transmitted without a return CR-T 1106, or a CR-T is transmitted without a return CR-R from the target receiver, both of which cancel the link), the other nodes see the initial CR transmission, but would not know the link is cancelled. Aspects of the present disclosure provide for a CR cancellation transmission in the next slot. The node will transmit another CR in slot 1 with content indicating that the previous CR is withdrawn. When the CR includes a node identity field, the other nodes would know which CR has been cancelled.

Figure 12:
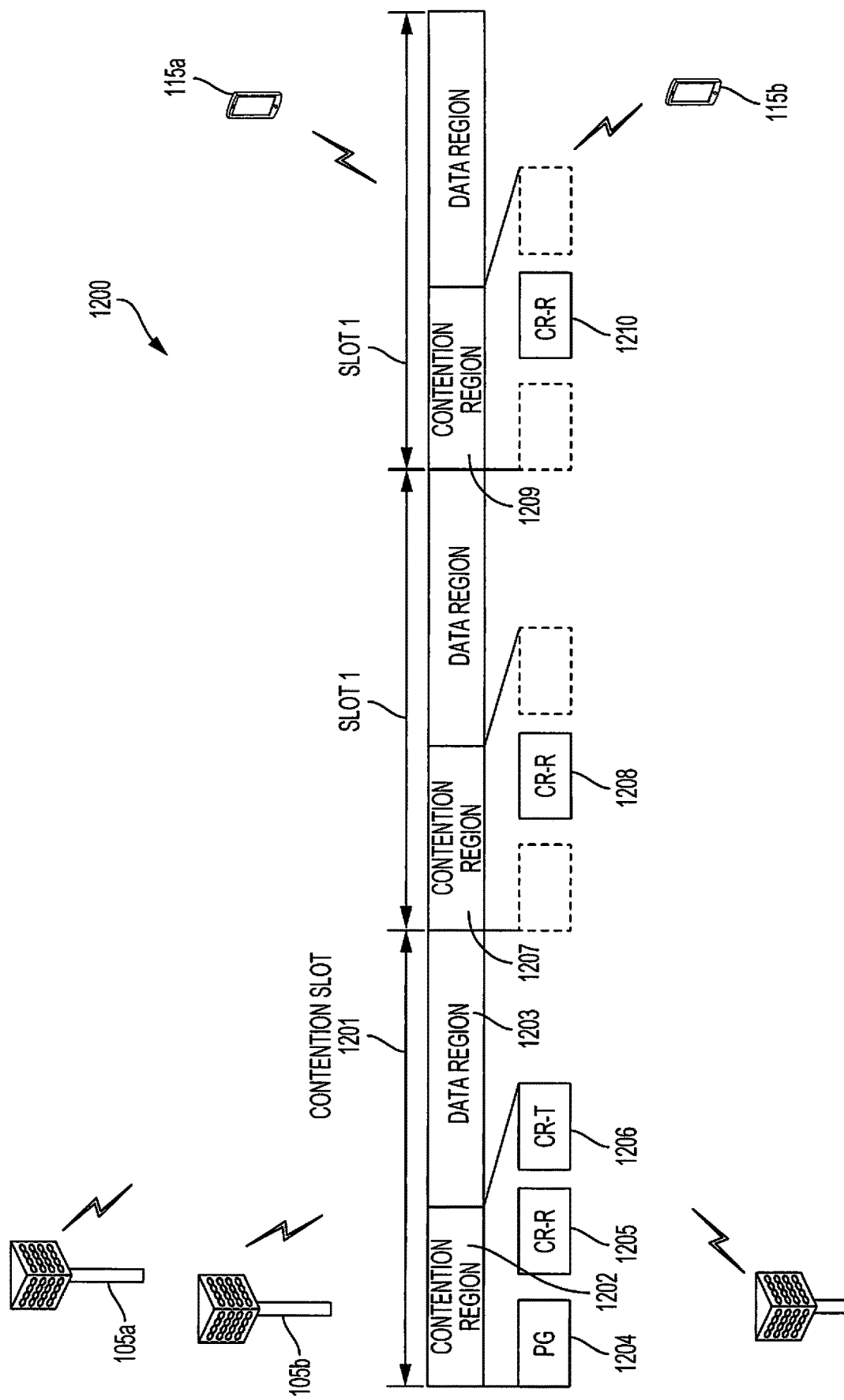
FIG. 12 is a block diagram illustrating a contention network configured according to one aspect of the present disclosure.

FIG. 12 is a block diagram illustrating a contention network 1200 configured according to one aspect of the present disclosure. In a second alternative aspect for multi-slot contention, the CRs may be repeated in the contention regions of each of the secured slots. For example, in contention slot 1201, the contention negotiation begins at contention region 1202. Base stations 105a-105c transmit contention PG 1204 that schedules communication establishing the transmitters and receivers among base stations 105a-105c and UEs 115a-115b. The receivers transmit CR-R 1205 followed by the transmitters transmitting CR-T 1206. By winning contention in contention region 1202, data may be transmitted from the target transmitters to the target receivers in data region 1203 and the data regions of subsequent slots 1 and 2. In such alternative aspect, the CR information will be complete, as all CR transmissions will be available in each of the secured slots. The winning receivers would subsequently transmit CR-R 1208 and 1210 in contention regions 1207 and 1209, respectively during slots 1 and 2.

Additionally, the various parameters of CR content can be further updated in later slots. Thus, should changes arise to the interference environment (e.g., as other links finish, changes in MCS, changes in SINR, etc.), the updated information may be communicated in the CR transmissions. The transmission of such CR in each of the secured slots (e.g., contention slot 1201 and slots 1 and 2) increases the CR overhead and potentially increases the CR capacity. With CR transmissions in each slot, only nodes scheduled in contention PG 1204 may need to monitor the CRs. Scheduled receiver nodes will transmit CR-R signals 1205, 1208, and 1210, and scheduled transmitter nodes will transmit CR-T signals 1206 accordingly, while the scheduled receiver nodes will detect CR-T 1206 and scheduled transmitter nodes will detect CR-R 1205, 1208, and 1210, respectively.

Various additional aspects of the present disclosure are directed to integration of CRs with reference signal bursts. In the previously described aspects of the present disclosure, the contention region of the slot is located before the data region. Within the contention region, transmissions, such as the contention PG, CR-R, and CR-T signals, are exchanged. Because of the need for processing the signal and transitions between uplink and downlink directions, processing and transition gaps would be scheduled between the CR transmission bursts. For example, a UE would decode the PG to know if it should transmit CR-R or CR-T. However, because the bursts may not be scheduled back-to-back, the additional gaps would count toward additional time domain overhead. For the data burst, there would typically be multiple bursts as well.

The data burst begins with a data pre-grant burst from the base station. The data pre-grant may potentially include a different set of information in the downlink direction. The data pre-grant burst from the base station may contain CSI-RS followed by a data pre-grant acknowledgement burst from the UE in the uplink direction. This may contain uplink control information (UCI) from the UE and may contain sound reference signal (SRS), followed by the normal data burst. When scheduling downlink communication, the downlink grant is followed by the downlink data, and then an uplink acknowledgement (e.g., ACK/NACK). When scheduling uplink communication, the uplink grant is followed by the uplink data. When all such communications between the base station and UE are combined, there may be too many transition and processing gaps to efficiently operate the contention procedures. Accordingly, additional aspects of the present disclosure are directed to combining the CR bursts and RS bursts and use each other's burst as a processing gap.

Figure 13:
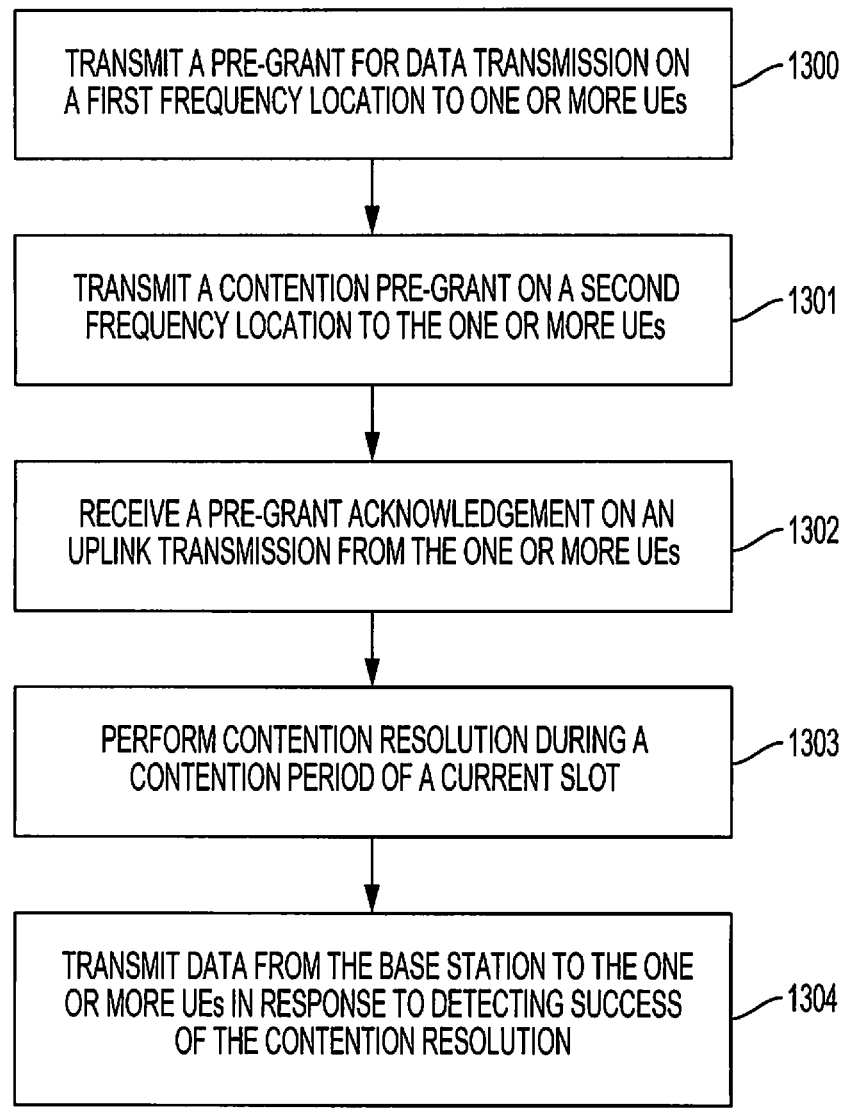
FIG. 13 is a block diagram illustrating example blocks executed to implement one aspect of the present disclosure.
Figure 14:
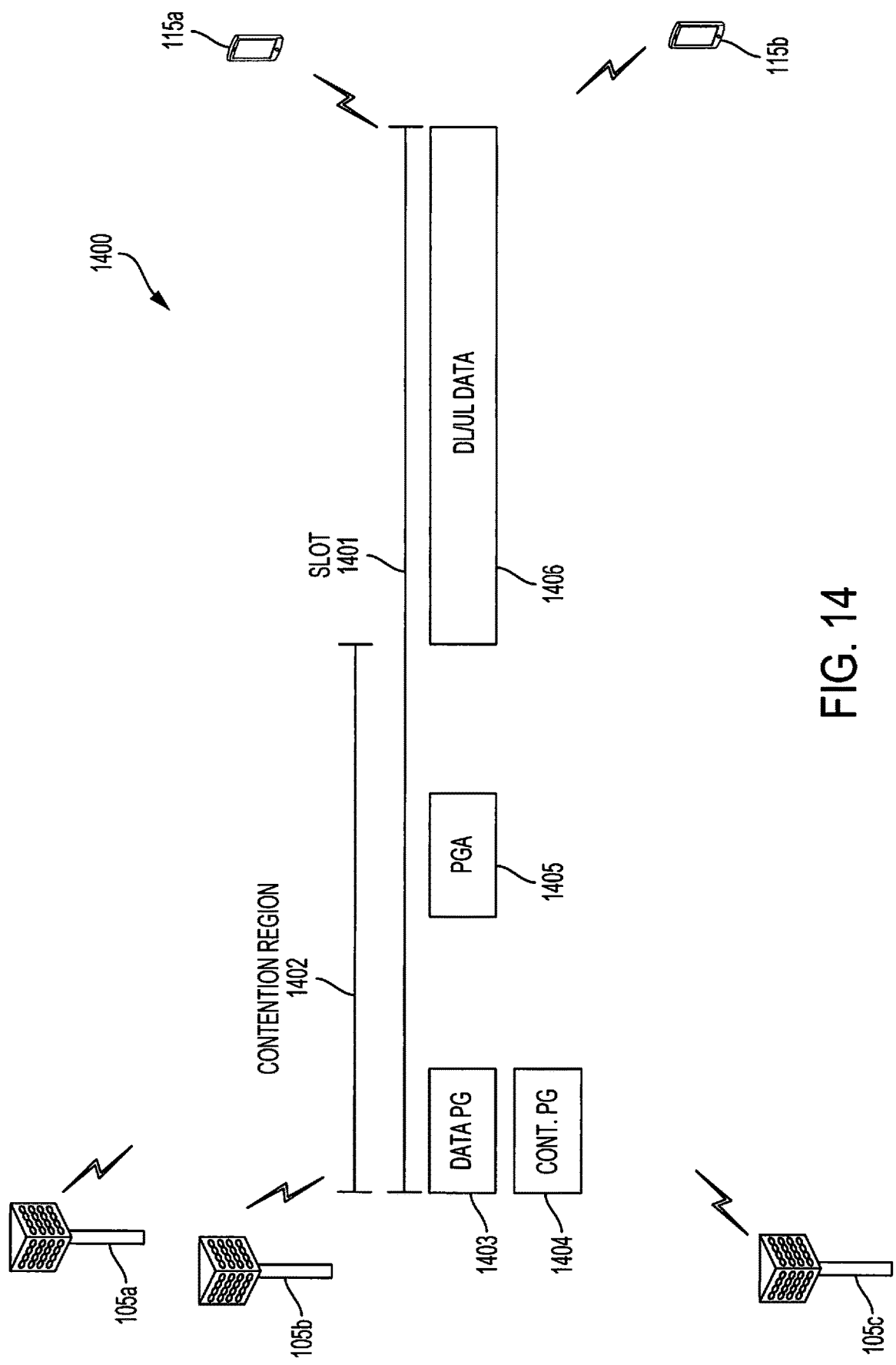
FIG. 14 is a block diagram illustrating a contention network configured according to one aspect of the present disclosure.

FIG. 13 is a block diagram illustrating example blocks executed to implement one aspect of the present disclosure. The blocks of FIG. 13 are also described with respect to contention network 1400 illustrated in FIG. 14. FIG. 14 is a block diagram illustrating contention network 1400 configured according to one aspect of the present disclosure. At block 1300, a base station transmits a pre-grant for data transmission on a first frequency location to one or more UEs. At block 1301, the base station transmits a contention pre-grant on a second frequency location to the one or more UEs. Base stations 105a-105c send data PG 1403 and contention PG 1404 within contention region 1402 of slot 1401. Data PG 1403 and contention PG 1404 are transmitted at different frequencies in a frequency division multiplex (FDM) manner. Data PG 1403 and contention PG 1404 may be FDM'd either in different control subbands, or using different new radio (NR) control channel elements (NR-CCEs) for the two types of PGs. Two different search spaces may be defined for each type of PG. At block 1302, the base station receives a pre-grant acknowledgement on an uplink transmission from the one or more UEs. For example base stations 105a-105c receive PGA 1405 from one of UEs 115a or 115b. The pre-grant acknowledgement, PGA 1405, is in response to the UEs 115a or 115b processing of data PG 1403.

At block 1303, the base station performs contention resolution during a contention period of a current slot. The contention resolution within contention region 1402 of slot 1401 may reserve a transmission link or channel for any of base stations 105a-105c for downlink communications or for UEs 115a-115b for uplink communications. At block 1304, the base station transmits the data to the UEs in response to detecting the successful contention resolution. Base stations 105a-105c or UEs 115a-115b may transmit downlink/uplink data 1406, respectively to the target entity.

Figure 15A:
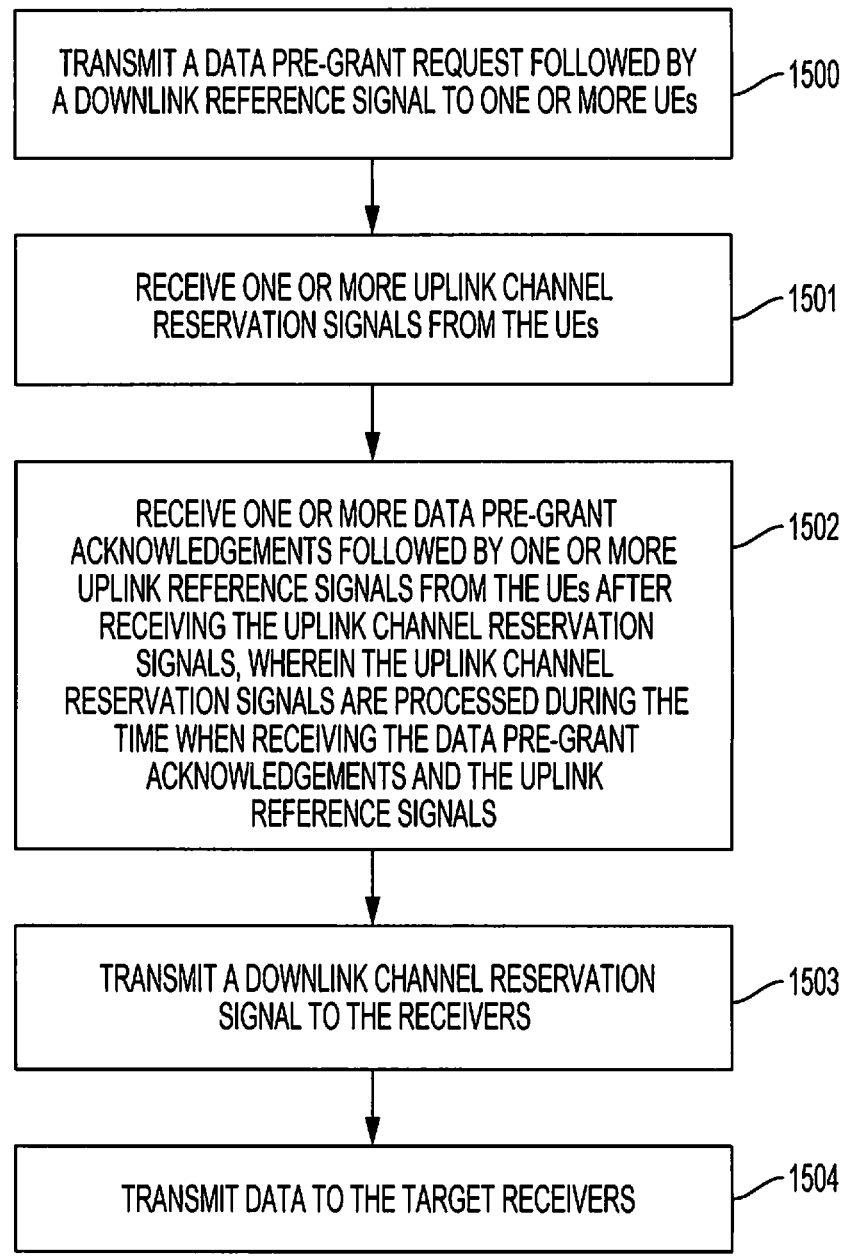
FIGS. 15A and 15B are block diagrams illustrating example blocks executed to implement aspects of the present disclosure.

FIG. 15A is a block diagram illustrating example blocks executed to implement one aspect of the present disclosure. At block 1500, a base station transmits a data pre-grant request followed by a downlink reference signal to one or more UEs. At block 1501, the base station receives one or more uplink channel reservation signals from the UEs. At block 1502, the base station receives one or more data pre-grant acknowledgements followed by one or more uplink reference signals from the UEs after receiving the uplink channel reservation signals, wherein the uplink channel reservation signals are processed during the time when receiving the data pre-grant acknowledgments and the uplink reference signals. At block 1503, the base station transmits a downlink channel reservation signal to the receivers. At block 1504, the base station transmits data to the target receivers.

Figure 15B:
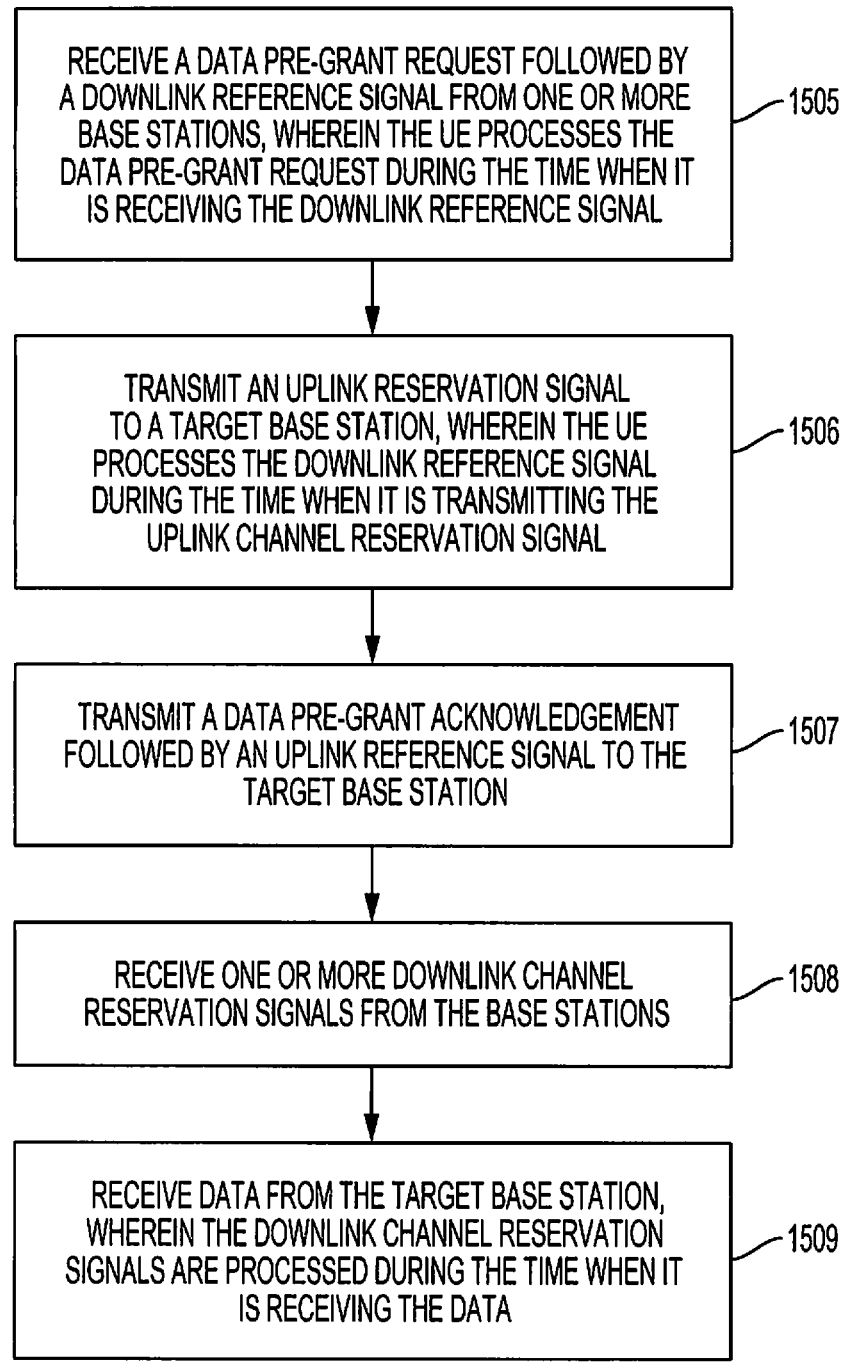

FIG. 15B is a block diagram illustrating example blocks executed to implement one aspect of the present disclosure. At block 1505, a receiver receives a data pre-grant request followed by a downlink reference signal from one or more base stations, wherein the UE processes the data pre-grant request during the time when it is receiving the downlink reference signal. At block 1506, the receiver transmits an uplink channel reservation signal to a target base station, wherein the UE processes the downlink reference signal during the time when it is transmitting the uplink channel reservation signal. At block 1507, the receiver transmits a data pre-grant acknowledgement followed by an uplink reference signal to the target base station. At block 1508, the receiver receives one or more downlink channel reservation signals from the base stations. At block 1509, the receiver receives data from the target base station, wherein the downlink channel reservation signals are processed during the time when it is receiving the data.

Figure 16:
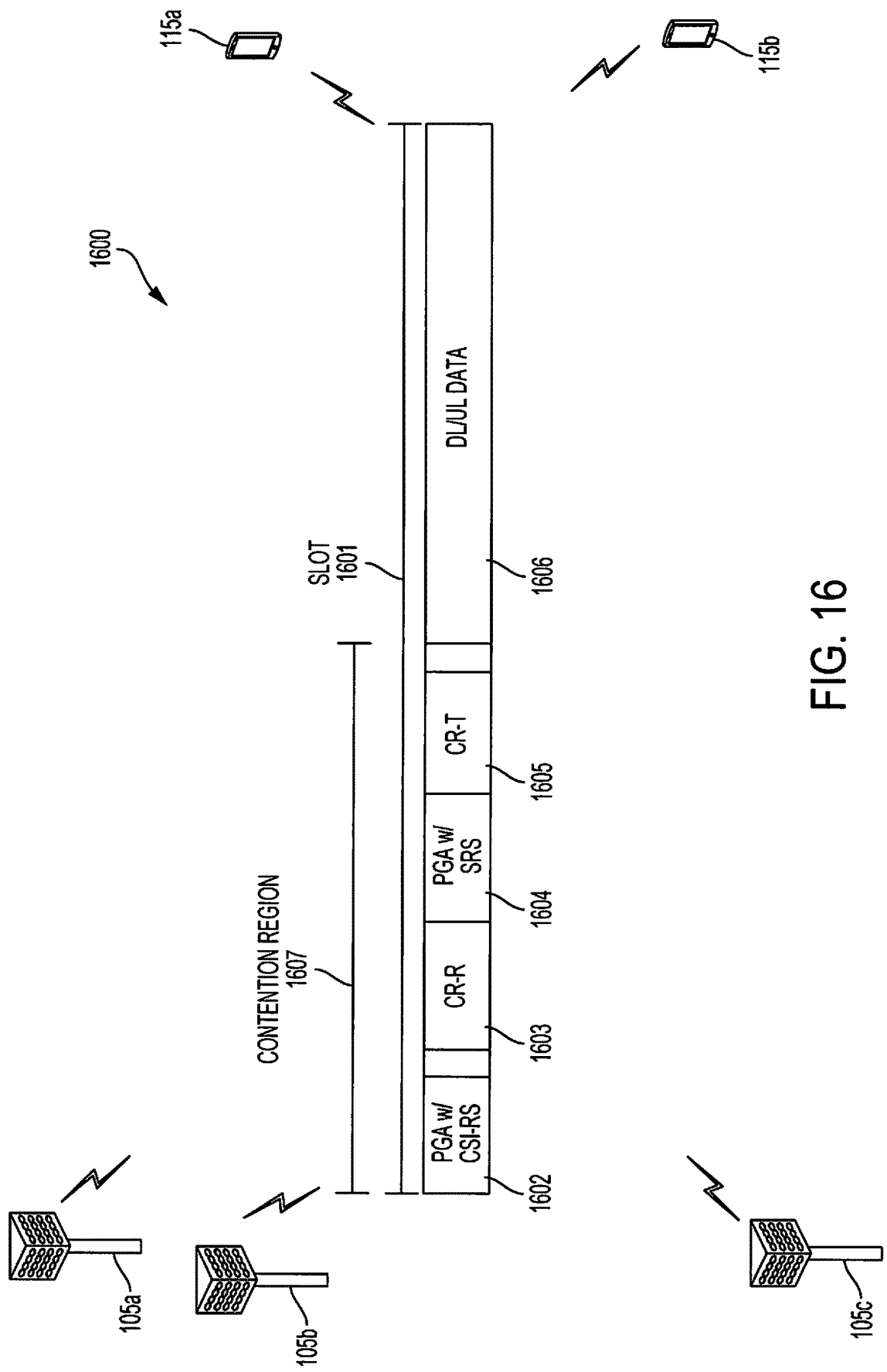
FIG. 16 is a block diagram illustrating a contention network configured according to one aspect of the present disclosure.

FIG. 16 is a block diagram illustrating a contention network 1600 configured according to one aspect of the present disclosure. One or more of base stations 105a-105c are in communication with one or more of UEs 115a-115b. During contention region 1607 of slot 1601, the transmission channel may be secured between the scheduled communicating entities. In the alternative aspect described at FIGS. 15A and 15B, reference signal (RS) bursts and CR bursts may be interlaced. In practical implementation of such an aspect, two threads are being mixed and used as each other's gap. For RS processing, the CR-R transmission burst serves as processing time for the data PG and CSI-RS, and the CR-T transmission burst serves as processing time for the PGA and SRS. For contention processing, the CSI-RS within the contention PG/CSI-RS block serves as processing time for the contention PG, the PGA/SRS transmission serves as processing time for CR-R, while the processing time for CR-T may be the entire data burst in the remainder of the slot. In the described alternative aspect, the data transmission may occur one slot after the contention is completed, which imparts additional delay.

For example, base station 105a-105c transmits PG with CSI-RS 1602 to one of UEs 115a-115b. While UEs 115a-115b are receiving the CSI-RS of PG with CSI-RS 1602, they are processing the PG. UEs 115a-115b transmits CR-R 1603 after processing PG. The transmission of CR-R 1603 allows UEs 115a-115b to finish processing PG with CSI-RS 1602. UEs 115a-115b transmit PGA with SRS 1604. During this time base station 105a-105c may process CR-R 1603. After determining the expected interference using the known transmit power and the maximum interference level from UEs 115a-115b, base stations 105a-105c transmit CR-T 1605. Depending on whether the communication scheduled by PG, base stations 105a-105c may transmit downlink data 1606 to UEs 115a-115b or UEs 115a-115b may transmit uplink data 1606 to base stations 105a-105c. During the time for transmitted data 1606, UEs 115a-115b may process CR-T 1605. By processing RS during contention blocks and processing contention transmissions during RS blocks, the contention resolution process according to various aspects of the present disclosure may occur within the timing designated for communication in slot 1601.

It should be noted that, because all signals are TDM, when implemented using mmW communications, different beams may be used for communication. As such, while gaps may be shown within the figures, such gaps may not be needed in operation. Because each node transmits its respective CR signals at the same burst location, the format of the slot would be known by all nodes in order to align CR-R/CR-T transmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3C-3G, 4A-4B, 5A-5B, 6, 7, 8, 9, 10, 11, 12, 13, 14, 15A-15B, and 16 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A channel reservation method comprising:
   detecting, by a first base station of a plurality of base stations sharing access to a shared radio medium of a network that is shared by a plurality of licensed network operators, transmission of one or more channel reservation signals, between a second base station of the plurality of base stations and a user equipment (UE) associated with the second base station, during a channel reservation hand-shaking operation conducted between the second base station and the UE; and
   refraining, by the first base station, from scheduling transmissions on the shared radio medium based on the detecting the one or more channel reservation signals of the channel reservation hand-shaking operation to reduce contention of access to the shared radio medium.

2. The method of claim 1, wherein time priority access has been assigned to the network, wherein the first base station is a second classified base station of the time priority access and the second base station is a first classified base station of the time priority access; and wherein the detecting comprises:
   listening, by the second classified base station, for a reservation response signal (RRS) that was sent by the first classified base station; and
   based at least on the listening, determining, by the second classified base station, whether to send a transmission on the shared radio medium, wherein the first classified base station is assigned a higher priority as compared to the second classified base station, when transmitting on the shared radio medium.

3. The method of claim 1, wherein time priority access has been assigned to the network, wherein the first base station is a second classified base station of the time priority access and the second base station is a first classified base station of the time priority access, and wherein the detecting comprises:
   listening; by the second classified base station, for a reservation request signal (RRQ) sent by the first classified base station; and
   based at least on the listening, determining, by the second classified base station, whether to send a transmission on the shared radio medium, wherein the first classified base station is assigned a higher priority as compared to the second classified base station, when transmitting on the shared radio medium.

4. The method of claim 3, wherein the detecting further comprises:
   deciding, by the second classified base station, that the first classified base station has scheduled a transmission based on the listening detecting the RRQ sent by the first classified base station; and
   wherein the refraining from scheduling transmissions on the shared radio medium comprises refraining, by the second classified base station, from transmitting during the transmission of the first classified base station.

5. The method of claim 3, further comprising:
   deciding, by the second classified base station, that the first classified base station has not scheduled a transmission; and
   based at least on the deciding, scheduling, by the second classified base station, a transmission using the shared radio medium.

6. A channel reservation system comprising:
   a plurality of devices that share access to a shared radio medium that is shared by a plurality of licensed network operators, wherein a first transmitting device of the plurality of transmitting devices is configured to detect transmission of one or more channel reservation signals, between a second transmitting device of the plurality of transmitting devices and a receiving device associated with the second transmitting device, during a channel reservation hand-shaking operation conducted between the second transmitting device and the receiving device, and wherein the first transmitting device is further configured to refrain from scheduling transmissions on the shared radio medium based on the detecting the one or more channel reservation signals of the channel reservation hand-shaking operation to reduce contention of access to the shared radio medium.

7. The system of claim 6, wherein the first transmitting device is a second classified base station and the second transmitting device is a first classified base station, wherein the second classified base station comprises:
   a base station processor operable to listen for a reservation response signal (RRS) that was sent by the first classified base station, wherein the base station processor is further operable to determine whether to send a transmission on the shared radio medium based at least on the listening; wherein the first classified base station is assigned a higher priority as compared to the second classified base station, when transmitting on the shared radio medium; and
   a base station transmitter operable to send a transmission on the shared radio medium.

8. The system of claim 6, wherein the first transmitting device is a second classified base station and the second transmitting device is a first classified base station, wherein the second classified base station comprises:
- a base station processor operable to listen for a reservation request signal (RRQ) sent by the first classified base station, wherein the base station processor is further operable to determine whether to send a transmission on the shared radio medium based at least on the listening; wherein the first classified base station is assigned a higher priority as compared to the second classified base station, when transmitting on the shared radio medium; and
- a base station transmitter operable to send a transmission on the shared radio medium.

9. The system of claim 8, wherein the base station processor is further operable to
- determine that the first classified base station has scheduled a transmission based on the listening detecting the RRQ sent by the first classified base station, and based at least on the determination, the base station transmitter is operable to refrain from transmitting during the transmission of the first classified base station.

10. The system of claim 8, wherein based at least on the determination, the base station processor is further operable to decide that the first classified base station has not scheduled a transmission,
- and based at least on the decision, the base station transmitter is further operable to transmit a transmission using the shared radio medium.

11. The system of claim 10, wherein the base station processor of the second classified base station is operable to schedule the transmission by at least:
- directing the base station transmitter to:
  - send an RRQ during a RRQ time slot within the shared radio medium assigned to the second classified base station for channel reservation hand-shaking operation, and
  - send an RRS during a RRS time slot within the shared radio medium assigned to the second classified base station for channel reservation hand-shaking operation; and
- directing a base station receiver to receive an uplink transmission on the shared radio medium.

12. A non-transitory computer-readable medium having program code recorded thereon, which causes channel reservation, the program code comprising:
- code for detecting, by a first base station of a plurality of base stations sharing access to a shared radio medium of a network that is shared by a plurality of licensed network operators, transmission of one or more channel reservation signals, between a second base station of the plurality of base stations and a user equipment (UE) associated with the second base station, during a channel reservation hand-shaking operation conducted between the second base station and the UE; and
- code for refraining, by the first base station, from scheduling transmissions on the shared radio medium based on the detecting the one or more channel reservation signals of the channel reservation hand-shaking operation to reduce contention of access to the shared radio medium.

13. The non-transitory computer-readable medium of claim 12, wherein time priority access has been assigned to the network, wherein the first base station is a second classified base station of the time priority access and the second base station is a first classified base station of the time priority access, and wherein the code for detecting comprises:
- code for listening, by a second classified base station, for a reservation response signal (RRS) that was sent by the first classified base station; and
- based at least on the listening, code for determining, by the second classified base station, whether to send a transmission on the shared radio medium, wherein the first classified base station is assigned a higher priority as compared to the second classified base station, when transmitting on the shared radio medium.

14. The non-transitory computer-readable medium of claim 12, wherein time priority access has been assigned to the network, wherein the first base station is a second classified base station of the time priority access and the second base station is a first classified base station of the time priority access, and wherein the code for detecting comprises:
- code for listening, by a second classified base station, for a reservation request signal (RRQ) sent by the first classified base station; and
- based at least on the listening, code for determining, by the second classified base station, whether to send a transmission on the shared radio medium, wherein the first classified base station is assigned a higher priority as compared to the second classified base station, when transmitting on the shared radio medium.

15. The non-transitory computer-readable medium of claim 14, further comprising:
- code for deciding, by the second classified base station, that the first classified base station has scheduled a transmission based on the listening detecting the RRQ sent by the first classified base station; and
- wherein the code for refraining, by the second classified base station, from scheduling transmissions refrains from transmitting during the transmission of the first classified base station.

16. The non-transitory computer-readable medium of claim 14, further comprising:
- code for deciding, by the second classified base station, that the first classified base station has not scheduled a transmission; and
- based at least on the deciding, code for scheduling, by the second classified base station, a transmission using the shared radio medium.

17. The non-transitory computer-readable medium of claim 16, further comprising:
- code for sending an RRQ during a RRQ time slot within the shared radio medium assigned to the second classified base station for channel reservation hand-shaking operation; code for sending an RRS during an RRS time slot within the shared radio medium assigned to the second classified base station for channel reservation hand-shaking operation; and
- code for receiving an uplink transmission on the shared radio medium.

18. The non-transitory computer-readable medium of claim 16, further comprising:
- code for sending an RRQ during an RRQ time slot within the shared radio medium assigned to the second classified base station for channel reservation hand-shaking operation;
- code for receiving an RRS during an RRS time slot within the shared radio medium assigned to the second classified base station for channel reservation hand-shaking operation; and code for sending a downlink transmission on the shared radio medium.

\* \* \* \* \*